United States Patent [19]

Allen

[11] 4,064,394
[45] Dec. 20, 1977

[54] ELECTRONIC DIGITAL PROCESS CONTROLLER HAVING SIMULATED ANALOG CONTROL FUNCTIONS

[75] Inventor: Bruce S. Allen, Southbury, Conn.

[73] Assignee: American Chain & Cable Company, Inc., Bridgeport, Conn.

[21] Appl. No.: 581,433

[22] Filed: May 28, 1975

[51] Int. Cl.² .................................... G06F 15/46
[52] U.S. Cl. .................................... 364/107; 364/104; 364/120; 364/200; 364/300
[58] Field of Search .......................... 340/172.5; 444/1

[56] References Cited

U.S. PATENT DOCUMENTS

| | | | |
|---|---|---|---|
| 3,267,434 | 8/1966 | Clark et al. | 340/172.5 |
| 3,686,639 | 8/1972 | Fletcher et al. | 340/172.5 |
| 3,868,648 | 7/1973 | Levin | 235/151.1 X |

Primary Examiner—Eugene G. Botz
Attorney, Agent, or Firm—Pennie & Edmonds

[57] ABSTRACT

An electronic process controller comprises a digital computer programmed to digitally simulate the functions of each of a plurality of conventional analog and discrete control blocks and a process operator's panel for selecting and arranging these simulated blocks into a simulated control circuit configuration. The operator's panel provides means for direct operator selection of: (1) the input signal to be processed by the computer; (2) the arrangement of simulated blocks for processing the input signal in order to derive an output process control signal; and (3) the output control device to which the output signal is directed. This controller permits assembly and modification of simulated analog process control configurations in a manner analogous to the assembly of conventional hard wire control circuits without the expense of wiring, breaking, and rewiring of hard wire interconnections. At the same time, it permits the operator to use a computer for providing analog control functions without knowledge of a specialized programming language.

27 Claims, 33 Drawing Figures

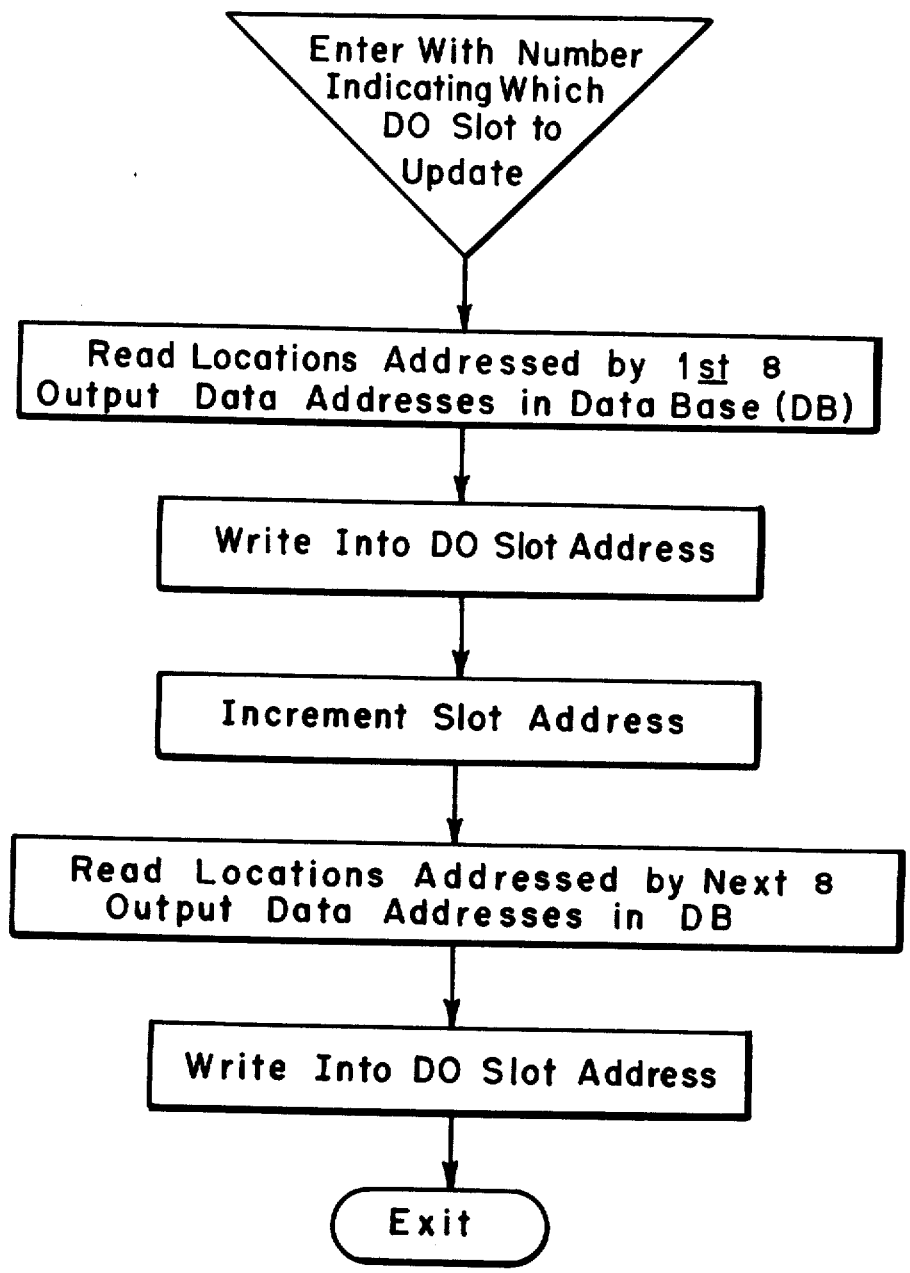
FIG. 7D  DO Program

Timer Program

Comparator Program

Multiplexor Program

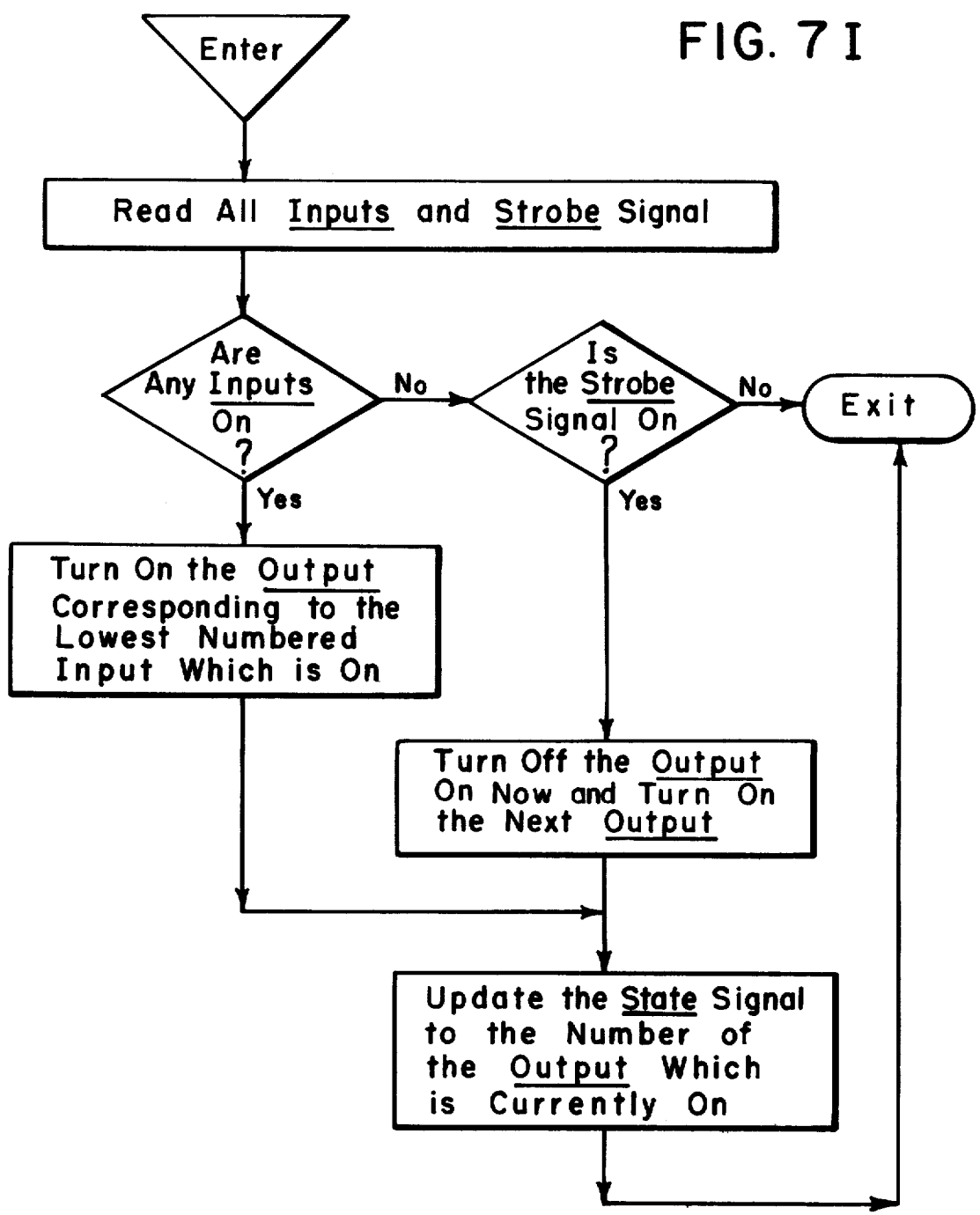
FIG. 7I Sequencer Program

BcD to Binary Program

Track/Hold Program

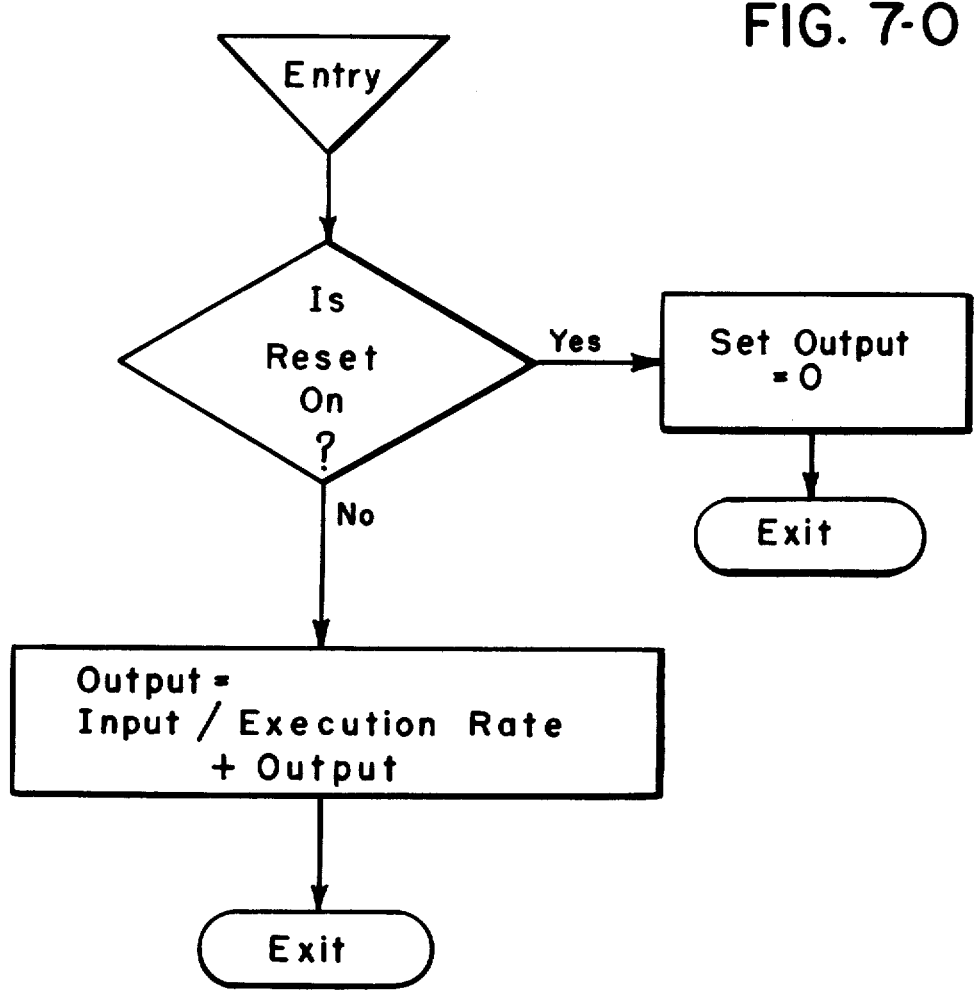
FIG. 7-O
Integrator Program

Differentiater Program

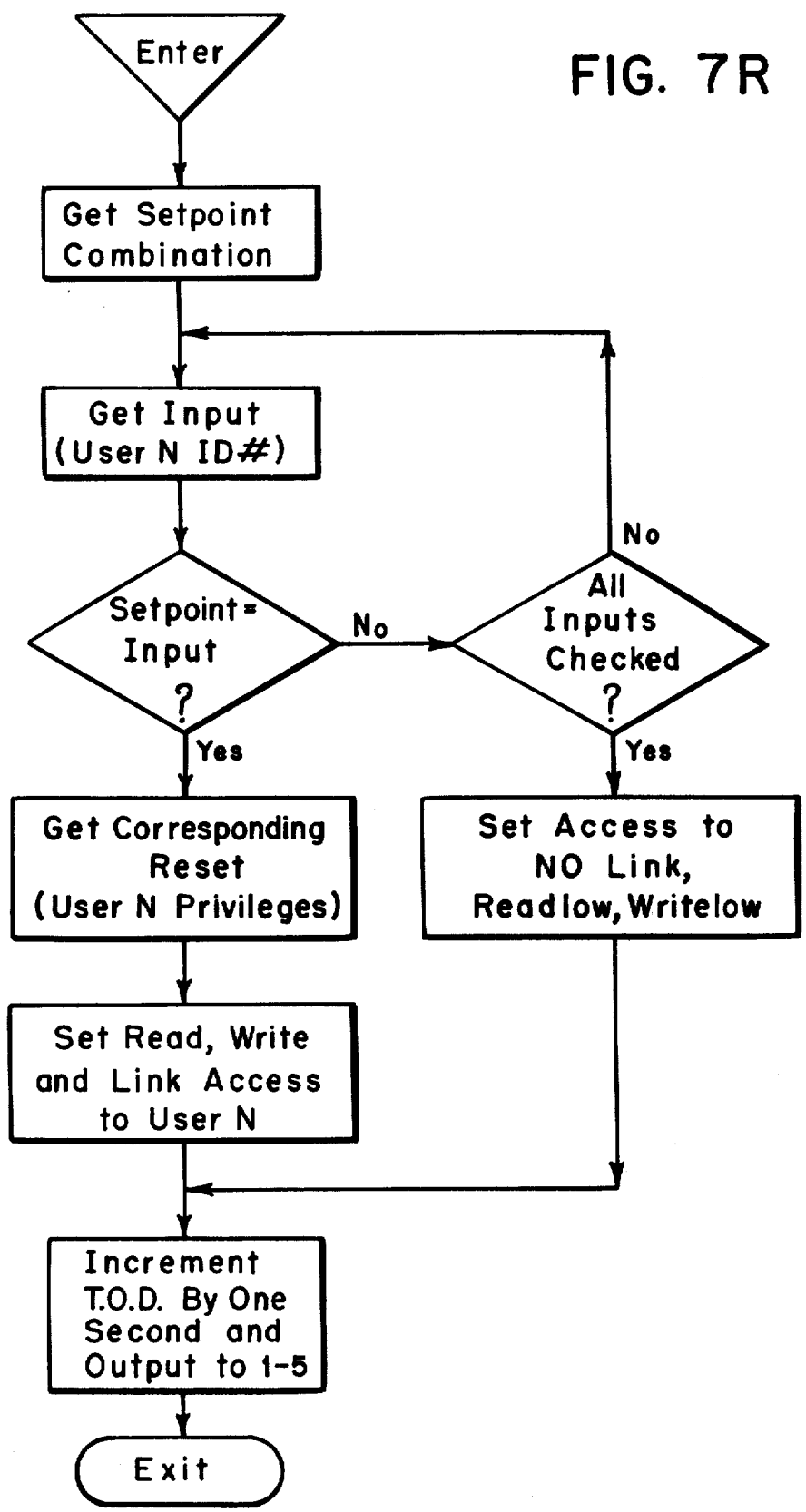
FIG. 7R — Time/Code Program

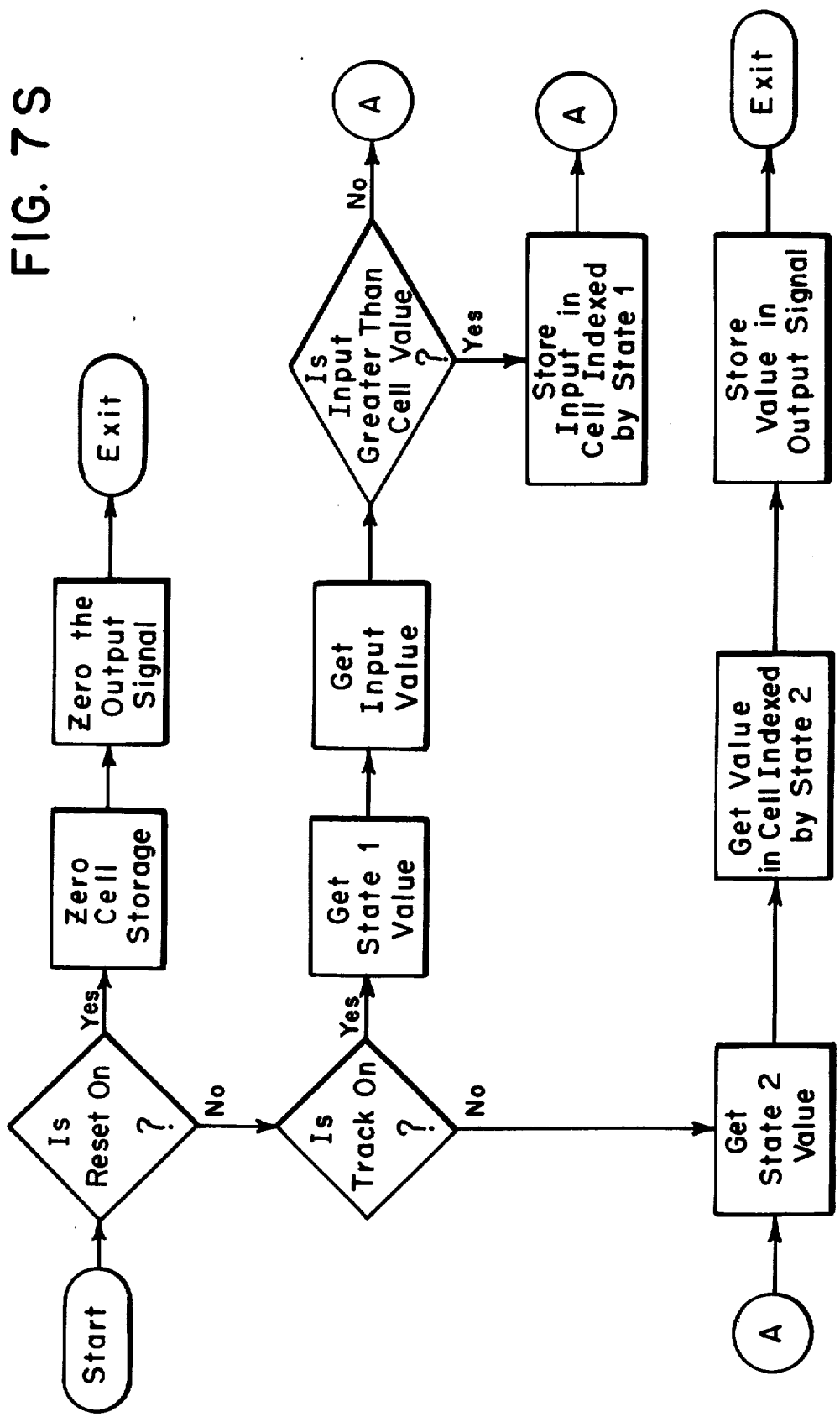
FIG. 7S Peak Detector Program

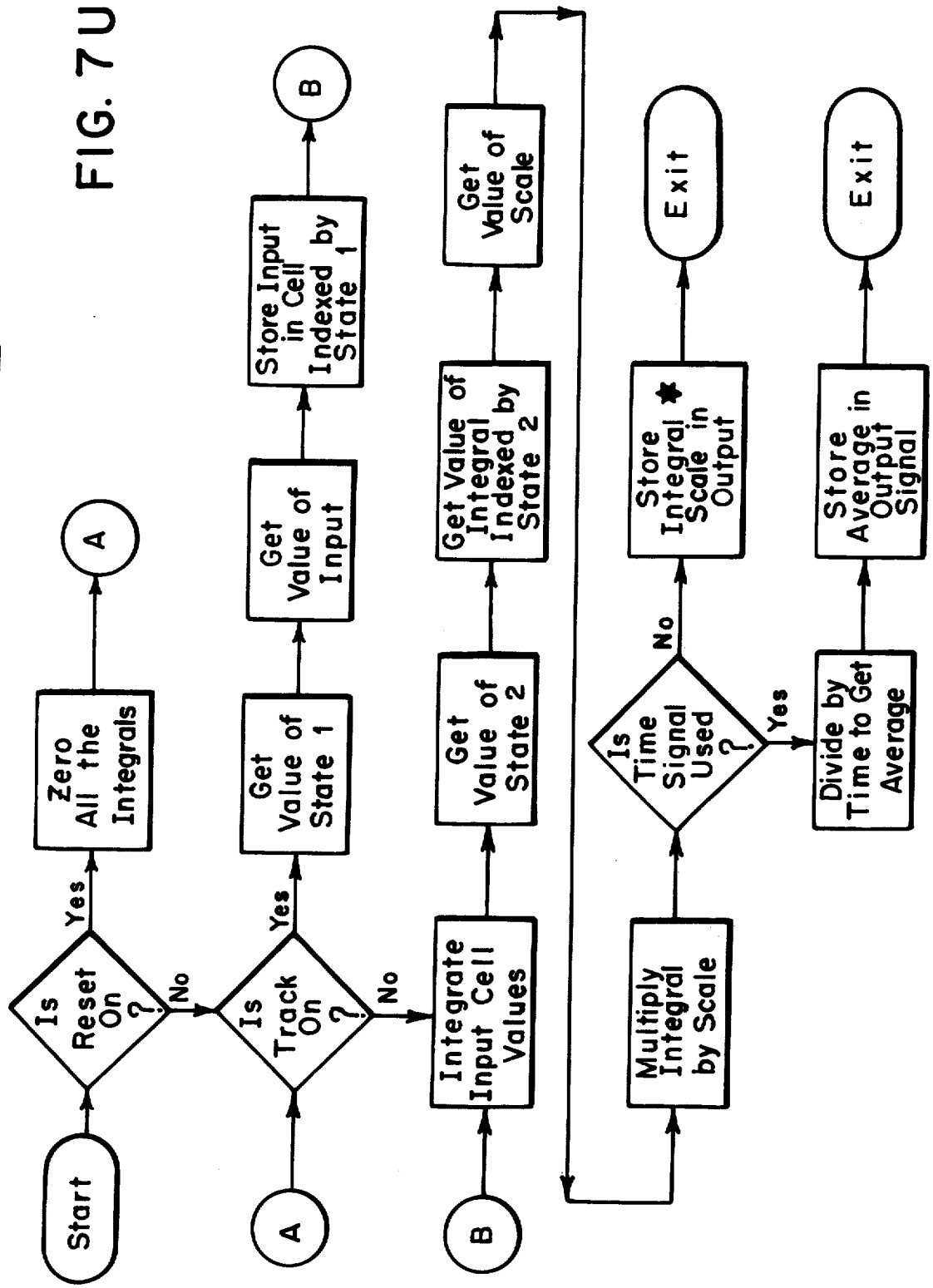

Function Program

Process Panel Programs
Read and Change Signal Mode

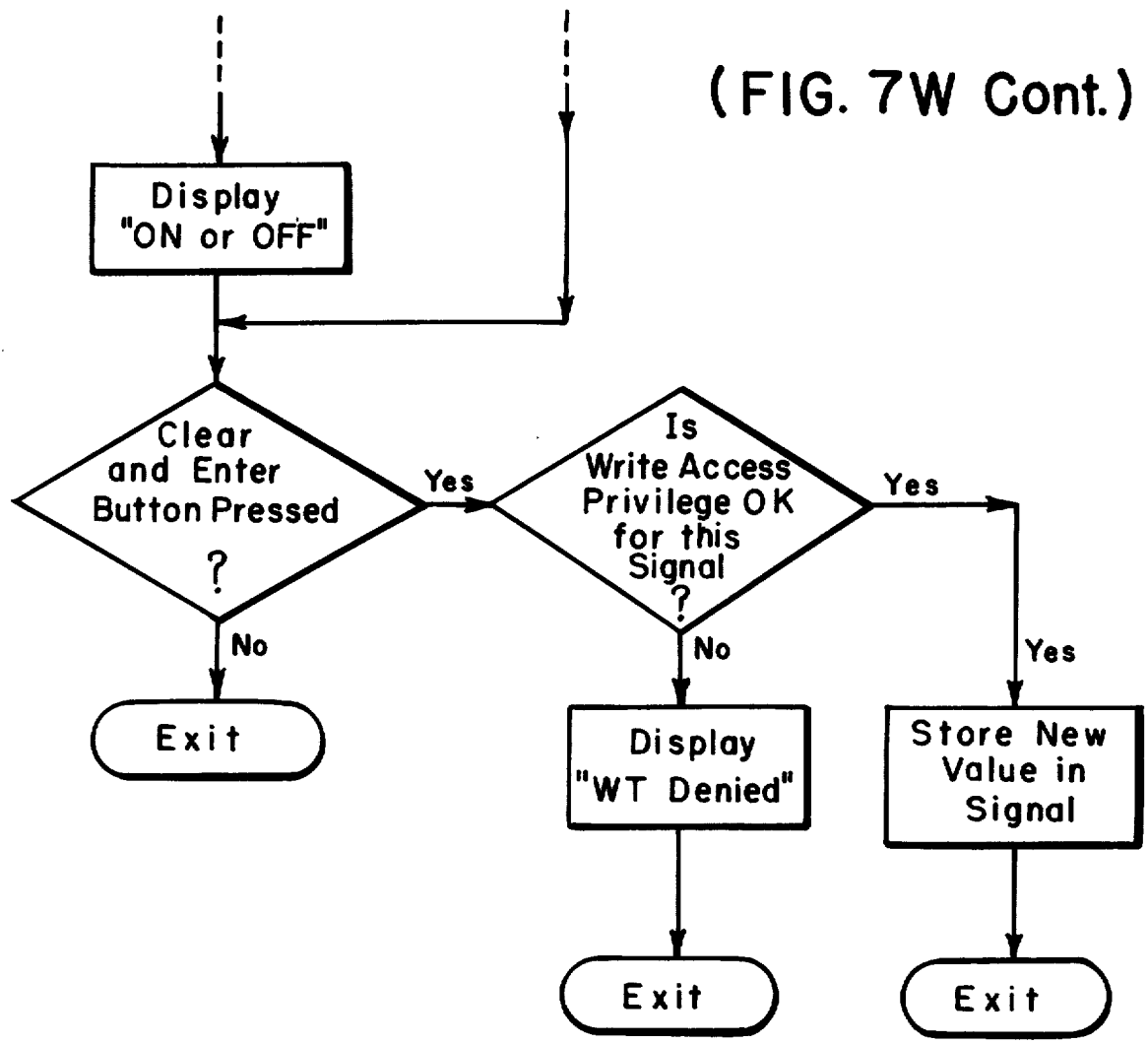

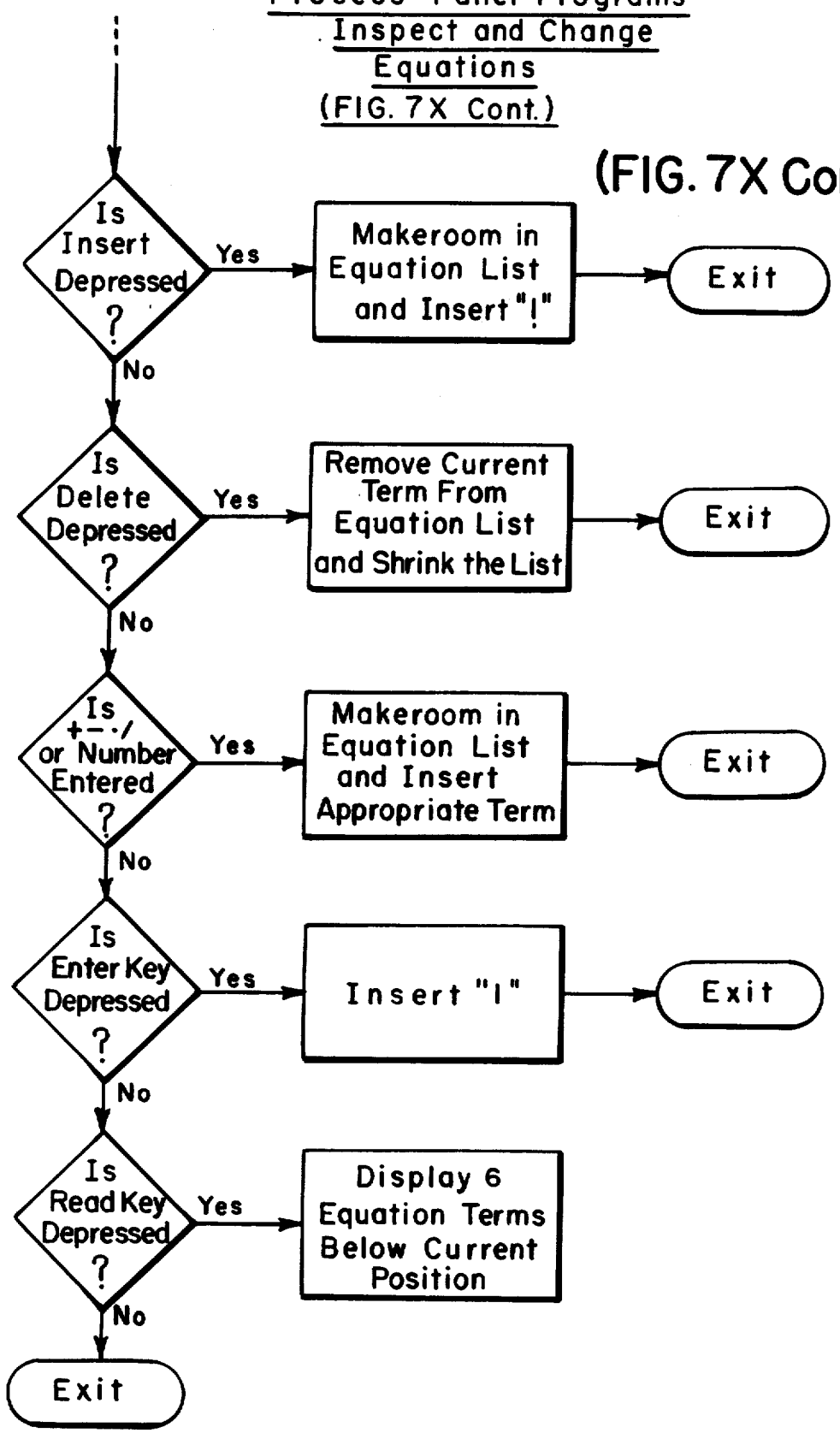

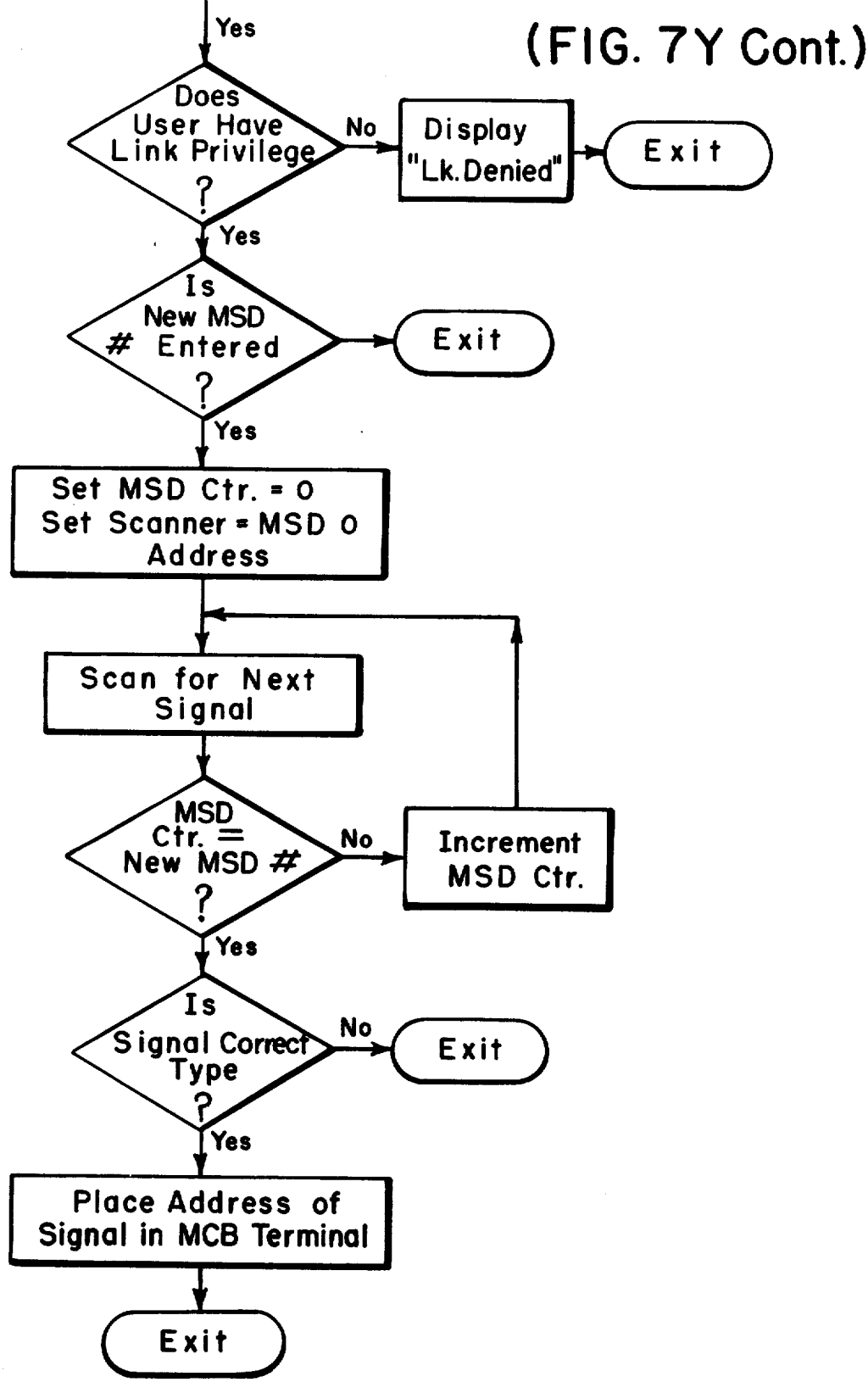

ELECTRONIC DIGITAL PROCESS CONTROLLER HAVING SIMULATED ANALOG CONTROL FUNCTIONS

BACKGROUND OF THE INVENTION

The present invention relates to an electronic process controller having simulated analog control functions.

Present systems for controlling complex industrial processes are relatively inflexible. Programmable logic controllers such as those described in U.S. Pat. No. 3,686,639 issued to W. B. Fletcher et al. and U.S. Pat. No. 3,829,842 issued to D. H. Langdon et al. are useful logic controllers for controlling the relatively straightforward operation of switch-operated machines, but they are of only limited utility in more complex processes where optimal control cannot be predicated on simple on-off decisions.

Control of complex processes requiring analysis of analog as opposed to simple digital signals has typically required the use of hardwired control circuits or specially programmed general purpose computers.

The control circuit approach involves physically interconnecting mechanical or electrical control blocks into the proper configuration for controlling the process in question. Each control block is a separate piece of hardware, such as a circuit board; and the blocks are interconnected into the desired circuit by hard wire. This approach is relatively inflexible in that modification of the process control requires breaking and rewiring of the hard wire connections. In addition, relative to the process control system described herein, the control circuit approach is:

1. expensive in medium to large size systems due to the cost of control blocks;
2. time consuming due to the labor required to mount and interconnect the blocks;
3. limited in accuracy of control; and
4. limited in the variety of control methods available.

An alternative approach to controlling complex processes involves the use of a general purpose computer specifically programmed to control the process in question. See, for example, U.S. Pat. No. 3,761,692 issued to E. G. Cope and U.S. Pat. No. 3,681,782 issued to F. T. Scanlon.

While the use of a specially programmed general purpose computer offers advantages in accuracy and variety of control as compared with the control circuit approach, it nonetheless comprises a relatively inflexible process control system. The programs required for specific process control are typically long, complex, and internally interrelated. They are written in specialized computer languages such as FORTRAN and BASIC or even Assembly Language. As a consequence, control systems using such computers cannot be readily modified by industrial engineers who are not specialists in computer programming.

BRIEF SUMMARY OF THE INVENTION

The present invention relates to an electronic process controller for controlling processes of the type requiring data processing of analog input signals indicative of the status of the process. The primary components of the controller are a digital computer, input means, output means, and a process operator's panel.

More specifically, the digital computer is coupled to the operator's panel, the input means, and the output means. The computer is programmed to digitally simulate the functions of each of a plurality of conventional analog and discrete process control blocks familiar to control engineers and to simulate a control circuit comprising a selected arrangement of selected ones of these control blocks.

The operator's panel is coupled to the digital computer. It includes means, in the form of keys, permitting selection of one or more analog process input signals to be processed by the computer. It also includes keys permitting selection of one or more simulated analog control blocks to process the selected input signals, and keys permitting selection of one or more output paths whereby process control signals derived from processing the input signals are directed to selected process control devices.

The input and output means include terminals for permitting connection to each of a plurality of process sensing and control devices, respectively, and input and output paths for coupling these devices to the computer.

BRIEF DESCRIPTION OF THE DRAWINGS

The advantages, nature, and various features of the invention will appear more fully upon consideration of the various illustrative embodiments now to be described in detail in connection with the accompanying drawings. In the drawings.

DETAILED DESCRIPTION

Figure 1:
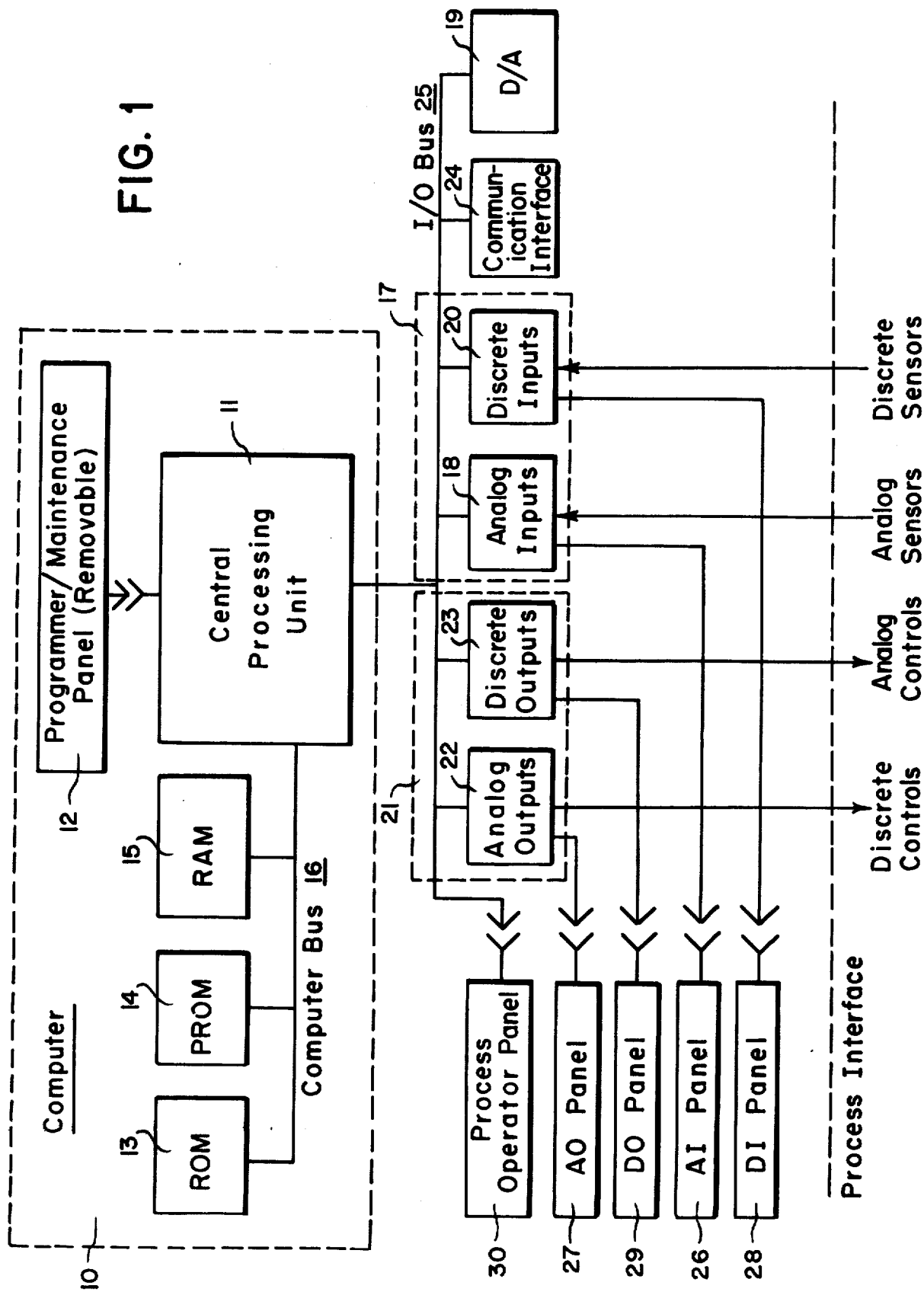
FIG. 1 is a block diagram of a typical electronic digital process controller in accordance with the invention.

Referring to the drawings, FIG. 1 is a block diagram of a typical electronic digital process controller in accordance with the invention. The primary components of the controller comprise a digital computer 10, input means 17, output means 21, and a process operator's panel 30.

The Structure Of The Computer

The structure of general operation of digital computers are well-known in the art. See, for example, Berkeley et al., *Computers: Their Operation and Application*, Reinhold Publishing Company, New York, New York (1956). In the preferred embodiment of the present invention, the computer 10 comprises a central processing unit 11 which includes a removable programmer panel 12 (optional), a read only memory 13, a programmable read only memory 14, and a random access memory 15. The precise composition of the memory used in a particular configuration depends upon the complexity of the process to be controlled and the importance of retaining data during power outages. Preferably, the central processing unit and each of the memories is modular so that the unit and its memories can be interconnected through a bus 16. In the preferred embodiment, central processing unit 11 is a small, but complete real-time, multiprogrammed computer, provided with standard features including 74 instruction execution capability, two microsecond cycle time, eight vectored interrupts, a crystal-controlled, real-time clock, power failure shutdown and restart capability, parity error detection, memory data save, and "watchdog" timer protection. With these features, many different programs of the type used in process control can be run concurrently in different time frames and at different priorities, and high speed response to critical process events is not compromised.

The following table (Table 1) is a list of commercially available components comprising a preferred digital computer for use in the invention, listed by reference element number (refer to FIG. 1), descriptive name, manufacturer, and part number.

TABLE 1

| Number | Description | Manufacturer | Part No. |
|---|---|---|---|
| 11 | Central Processing Unit | Intel Corporation Santa Clara, Calif. | 8080 |
| 13 | Read Only Memory | Intel Corporation | 8308 |
| 14 | Programmable Read Only Memory | Intel Corporation | 2708 |
| 15 | Random Access Memory | Intel Corporation | 2107B-6 |

The Function And Structure Of The Input And Output Means

The controller comprises input means 17 for receiving output signals from a plurality of analog and digital process sensing instruments and for coupling these signals, in suitable form, to the computer. In substance, the input means 17 comprises one or more analog input modules 18 provided with a plurality of terminals (not shown) for (1) receiving analog differential electrical input signals from analog process sensing devices, (2) operating in conjunction with digital-to-analog converter 19 to convert the analog input signals into digital form, and (3) transmitting the signals to the computer over a plurality of respective paths. A preferred module which can accept eight or more analog signals having a voltage range from 0–10 volts (or alternatively 1–5 volts) and a current range from 4–20 milliamps is illustrated in FIG. 2.

Figure 2:
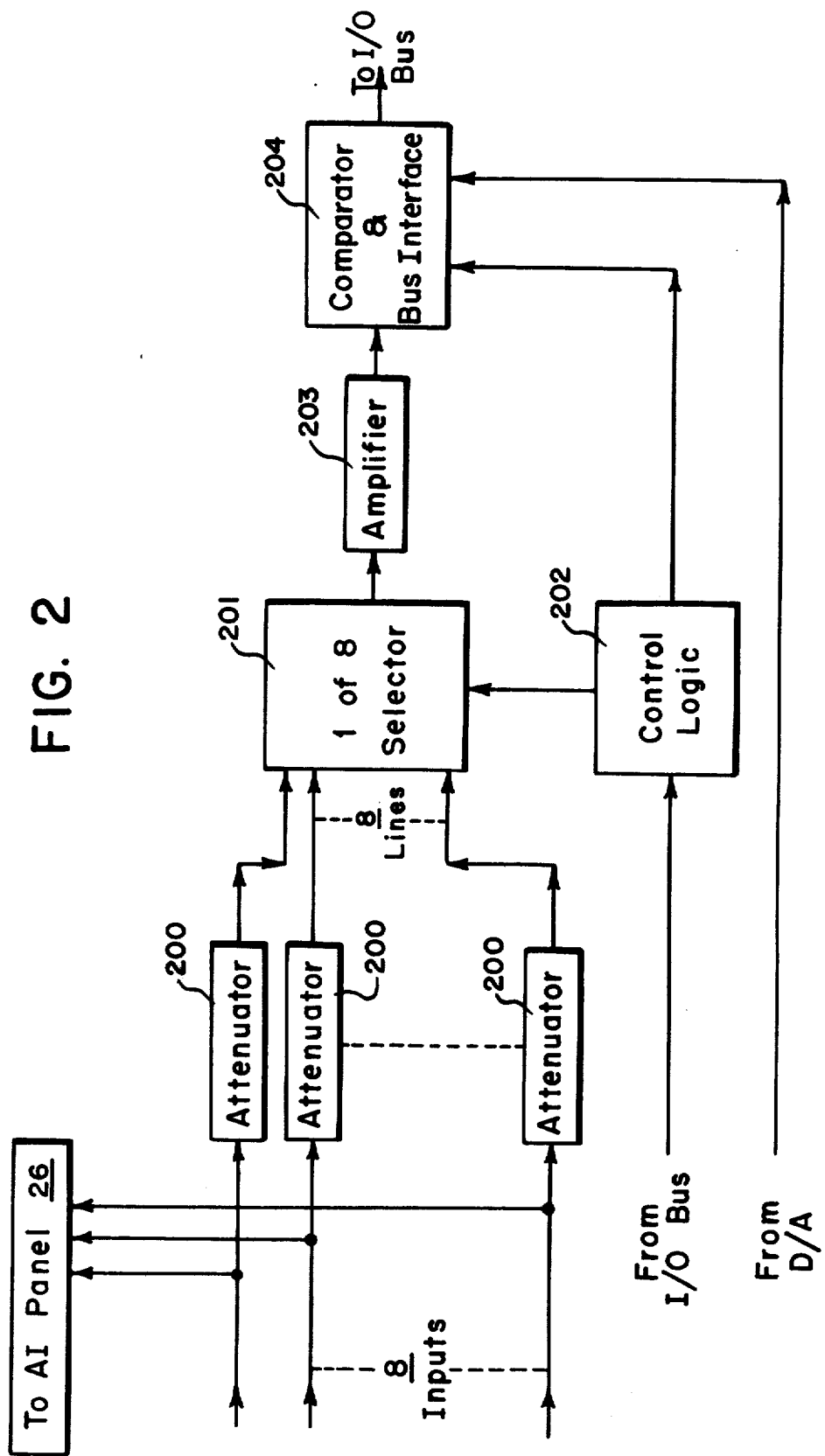
FIG. 2 is a schematic diagram showing the circuitry of an analog input module in greater detail.

The analog input module illustrated in FIG. 2 comprises, in substance, a plurality of attenuators 200 for receiving a respective plurality of analog signals and limiting the voltage thereof to levels acceptable by the subsequent circuitry. The outputs of the attenuators are applied to a selector 201 which selects one of the plurality of signals in response to a command from control logic 202. The selected signal is passed through amplifier 203 to comparator 204 wherein the numerical value of the analog signal is ascertained by a series of successive approximations. In brief, the comparator compares the analog signal with a computer estimated value from the digital-to-analog converter. If the signal is greater than the estimation, the output is 0 and if the signal is less, the output is 1. By 12 steps of successive approximations beginning at one-half of the scale voltage, the computer is able to ascertain the value of the signal to within 0.0025 volts The preferred input means 17 also comprises one or more discrete input modules 20 provided with a plurality of terminals (not shown) for receiving discrete electrical input signals from discrete process sensing devices, converting the discrete input signals to appropriate levels of current and voltage, and transmitting the signals to the computer over a plurality of respective paths. A preferred module which can accept sixteen or more such signals in the form of voltages of up to 110 volts AC or DC is illustrated in FIG. 3.

Figure 3:
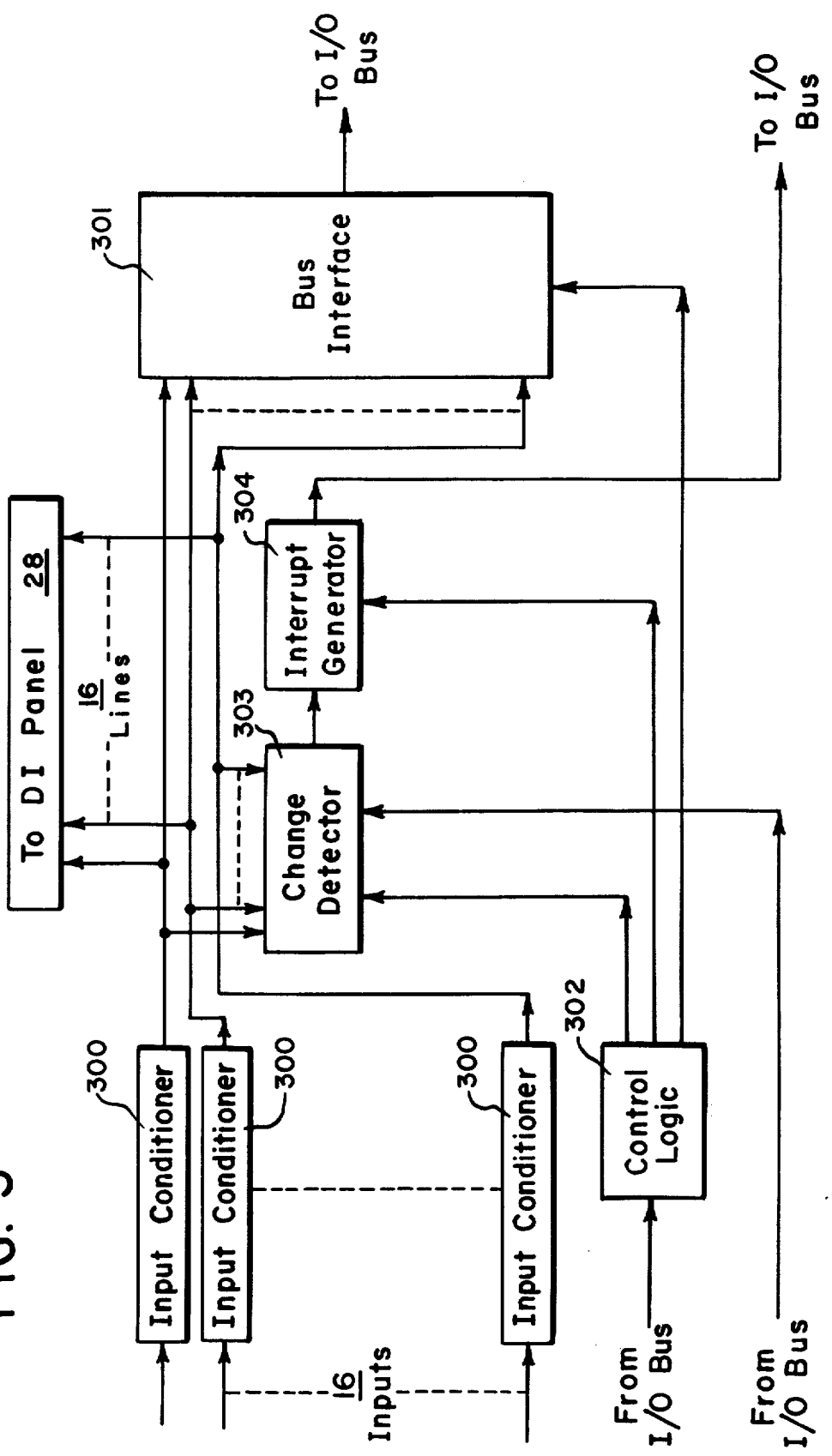
FIG. 3 is a schematic diagram showing the circuitry of a discrete input module in greater detail.

The discrete input module illustrated in FIG. 3 comprises, in substance, a plurality of input conditioners 300 for receiving a respective plurality of discrete input signals, converting them into uniform voltages acceptable to the subsequent circuitry and providing some degree of noise filtering. The outputs of the input conditioners are applied to a bus interface 301 which, in response to commands from control logic 302, applies a selected group of the plurality of signals to the computer through the input/output bus. The bus interface comprises, in essence, a plurality of NAND gates. In addition, the lines between the respective input conditioners and the bus interface are each connected to a change detector 303 coupled to an interrupt generator 304. When one of the discrete process sensors changes state, detector 303 activates interrupt generator 304 which, in turn, sends a high priority signal to the computer.

The controller also comprises output means 21 for generating output control signals in response to commands from computer 10 and transmitting these control signals through respective output paths to a plurality of respective process control devices. In substance, the output means 21 comprises one or more analog output modules 22 for (1) receiving digital commands from the computer, (2) converting the commands to electrical analog control signals, and (3) transmitting these analog signals through respective paths to a plurality of analog process control devices. A preferred module which can transmit signals having a voltage range from 0–10 volts (or 1–5 volts) at a current range from 4–20 milliamps to four or more analog control devices is illustrated in FIG. 4.

Figure 4:
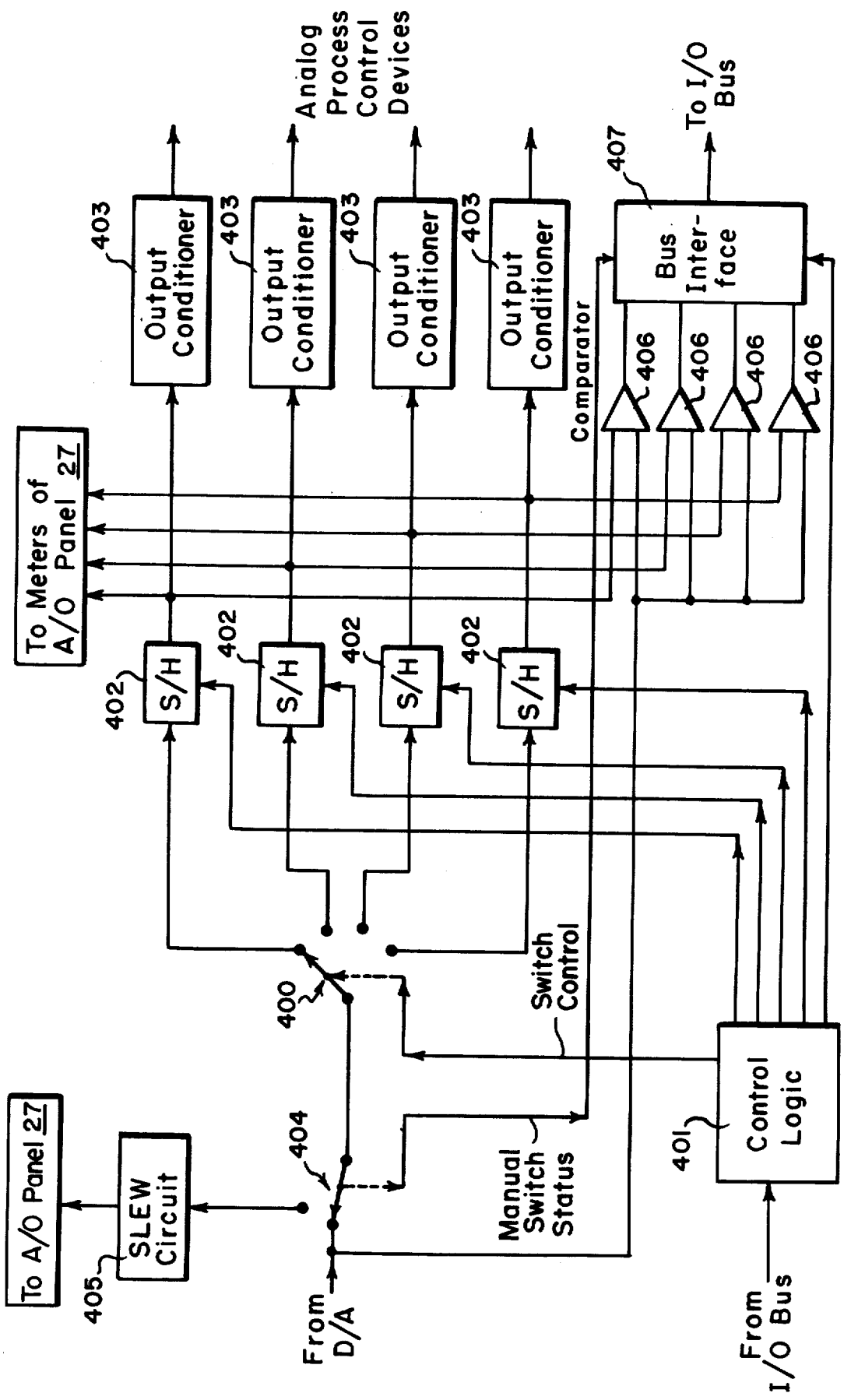
FIG. 4 is a schematic diagram showing the circuitry of an analog output module in greater detail.

The analog output module illustrated in FIG. 4 comprises, in substance, a multiple-position switch 400 for determining, in response to a command from the control logic 401, which of a plurality of sample-and-hold circuits 402 a signal from the digital-to-analog converter is transmitted to. In turn, the voltage signals held in the sample-and-hold circuits are transmitted to output conditioners 403 for amplifying and limiting the voltages to levels acceptable to the analog control devices. In addition, the module is provided with an override from the analog output manual panel through a two-position switch 404 and a slew circuit 405. Through this arrangement the operator can override the computer and set the value of any analog output. The manual override switch status 404 is sensed by the computer via the bus interface 407 and if the switch 404 is in manual, the value stored in the sample and hold 402 is determined by the computer through the use of comparators 406, the bus interface 407 and the D/A signal. This feedback value may be used by the computer to perform bumpless manual to automatic transfer.

The preferred output means 21 also comprises one or more discrete output modules 23 for (1) receiving discrete signals from the computer, (2) converting these signals to discrete control signals having appropriate levels of current and voltage, and (3) transmitting these discrete control signals through respective paths to a plurality of discrete process control devices. A preferred module which can switch currents of up to 300 milliamps at voltages of up to 50 volts for transmission to 16 or more discrete control devices is illustrated in FIG. 5.

Figure 5:
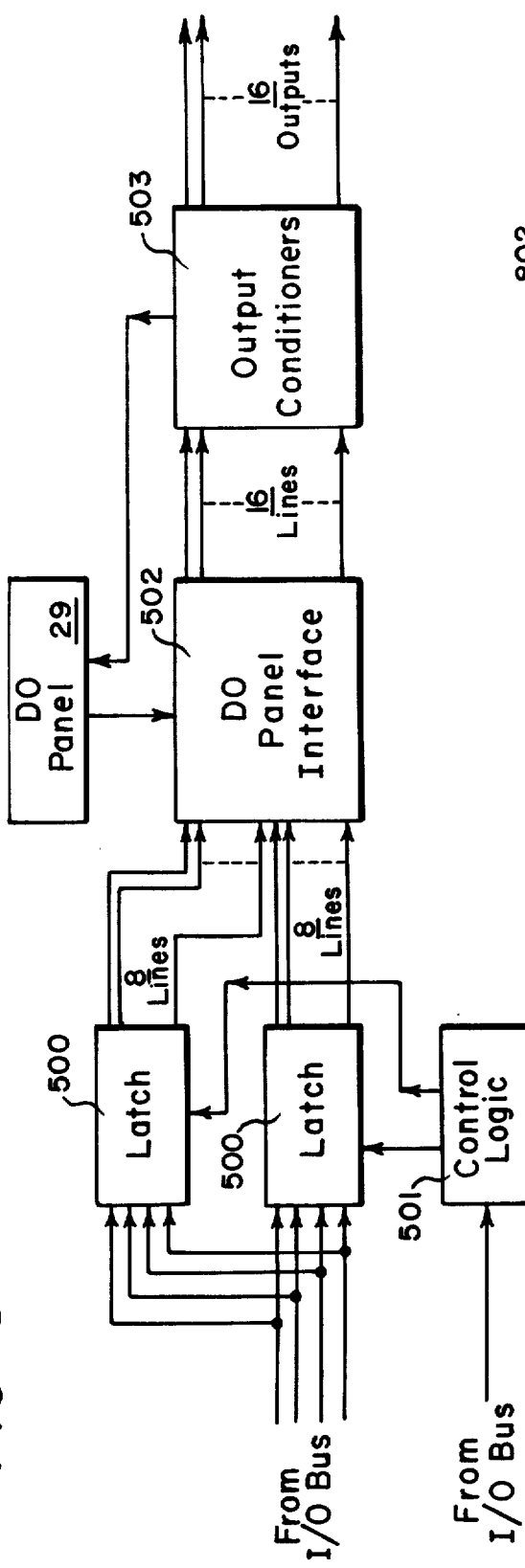
FIG. 5 is a schematic diagram showing the circuitry of a discrete output module in greater detail.

The discrete output module illustrated in FIG. 5 comprises, in substance, a pair of latch circuits 500 for sampling-and-holding discrete signals from the computer through the input/output bus in response to a capture command from the control logic 501. Time multiplexing is achieved by alternatively activating the two latches. Upon receipt of a command from the control logic, the sampled, multiplexed discrete signals are transmitted to the interface circuit 502 for the discrete output manual panel where they can be manually overriden or, alternatively, transmitted to a plurality of output conditioner circuits 503 which convert them to a uniform voltages for transmission to respective discrete process control devices.

The input and output modules, the converter 19 and a communication interface 24 are all coupled to the central processing unit through an input/output bus 25 without intervening cable.

The Function And Structure Of the Manual Panels

Manual panels 26 through 29 are coupled to the input and output modules in order that the process control engineer may have access to the signals being received and control over those being sent out. The analog input panel 26 is provided with a plurality of meters for simultaneously displaying the value of the analog signals received at in several selected analog inputs. It is connected to the analog input module as shown in FIG. 2.

The analog output panel 27 is similarly provided with a plurality of meters for simultaneously displaying the value of the analog signals present at several selected analog outputs. It is also provided with switching means for manually overriding computer control of the analog output. It is connected to the analog output module as shown in FIG. 4.

The discrete input panel 28 is provided with indicators, such as light emitting diodes, for simultaneously displaying the state of several different discrete inputs. It is connected to the discrete input module as shown in FIG. 3.

The discrete output panel 29 is likewise provided with indicators for simultaneously displaying the state of several discrete outputs. It is also provided with switching means for manually overriding computer control of the discrete process control devices. It is connected to the discrete output module as shown in FIG. 5.

The Function and Structure Of The Process Operator's Panel

The process operator's panel 30, provides the primary interface between the process control engineer and the electronic process controller. In substance, the process operator's panel provides means, in the form of selectable keys, whereby the process control engineer can select one or more analog and discrete input signals to be processed by the computer, one or more digitally simulated analog and discrete control blocks to process selected input signals, and one or more output paths through which process control signals derived from processing the input signals can be transmitted to one or more selected process control devices, respectively. In addition, the panel provides means for specifying the position of each one of a plurality of selected simulated control blocks in a simulated control circuit.

Figure 6:
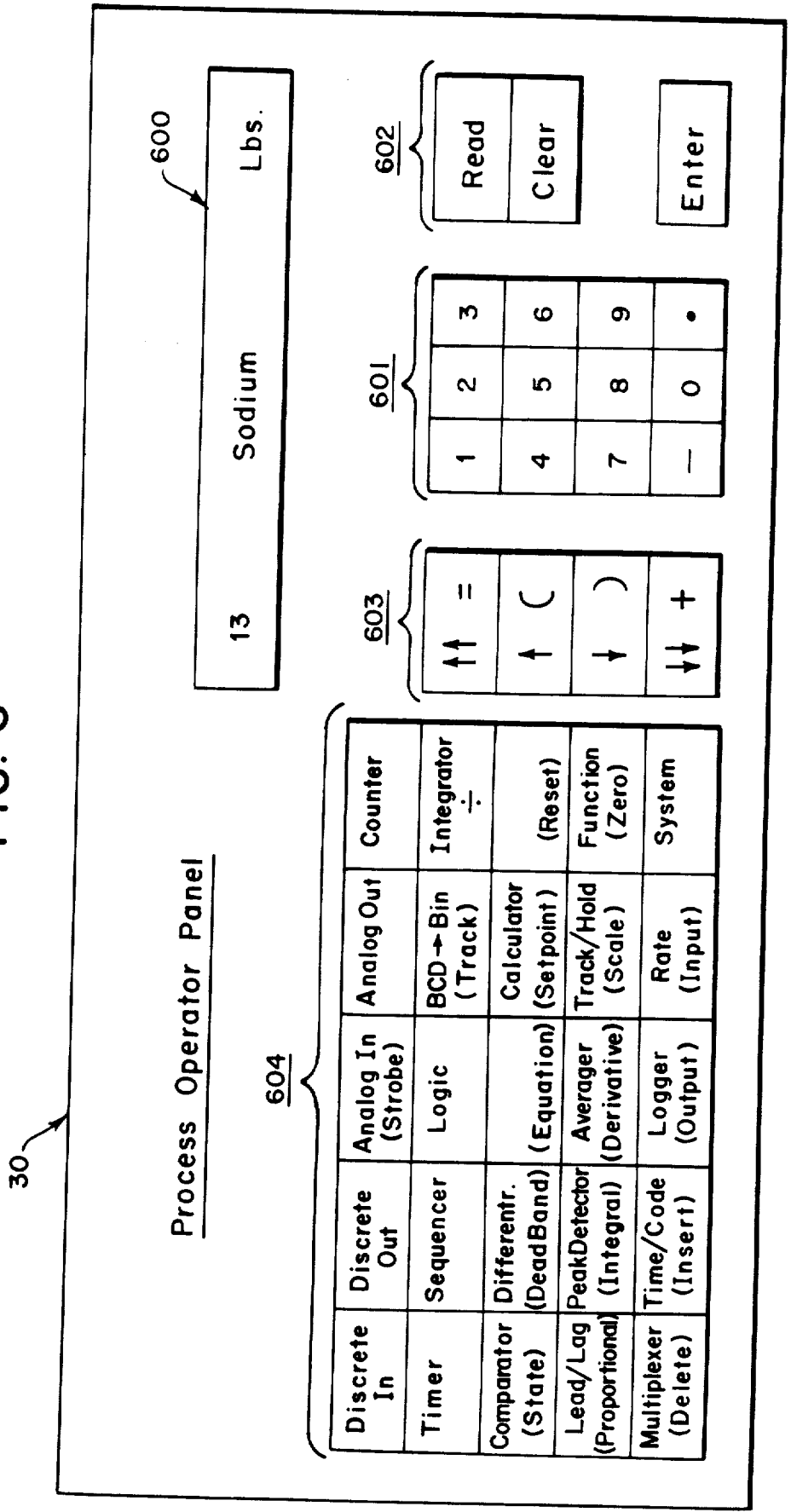
FIG. 6 illustrates a preferred process operator's panel in accordance with the invention.

The structure and operation of the process operator's panel 30 may be understood by reference to FIG. 6, which illustrates a preferred embodiment of such a panel comprising four classes of keys and an alphanumeric display panel 600. The four classes of keys include:

1. Numeric entry keys 601;
2. Entry control keys 602;
3. Miscellaneous keys 603; and
4. Function selection keys 604.

The numeric entry keys 601 include keys for the digits zero through nine, a decimal point key and a negation key. The are used primarily for the entry of numerical data.

The entry control keys 602 provide the user with means for ascertaining process control variables and the means for entering new values for such control variables. The READ key causes the value of a selected variable to be displayed on display panel 600. The CLEAR key clears the display panel, but it does not set the value of the variable to zero. The ENTER key can be used to enter a new value as a selected process control variable.

The miscellaneous keys 603 provides keys useful in programming. The key marked ↑ ↑ = is a multi-function key. It is used to slew rapidly to the the right when reading a logic or arithmetical equation on display 600, or to enter an equals sign in defining or modifying an equation. It can be used to increase the value of any internal or output analog signal by 20% per second. Similarly, the key marked ↓ ↓ + is used to slew rapidly to the left in reading an equation or to enter a logical or arithmetical "+" sign. It can also be used to decrease the value of an analog signal by 20% per second. The key marked ↑ (serves three functions. It is used to slew slowly to the right in reading an equation, or to enter a left parenthesis in modifying an equation. It is also used to increase the value of an analog signal by 2% per second. Similarly, the key ↓ ) slews slowly to the left, enters a right parenthesis, or decreases the value of an analog signal by 2% per second.

Figure 7A:
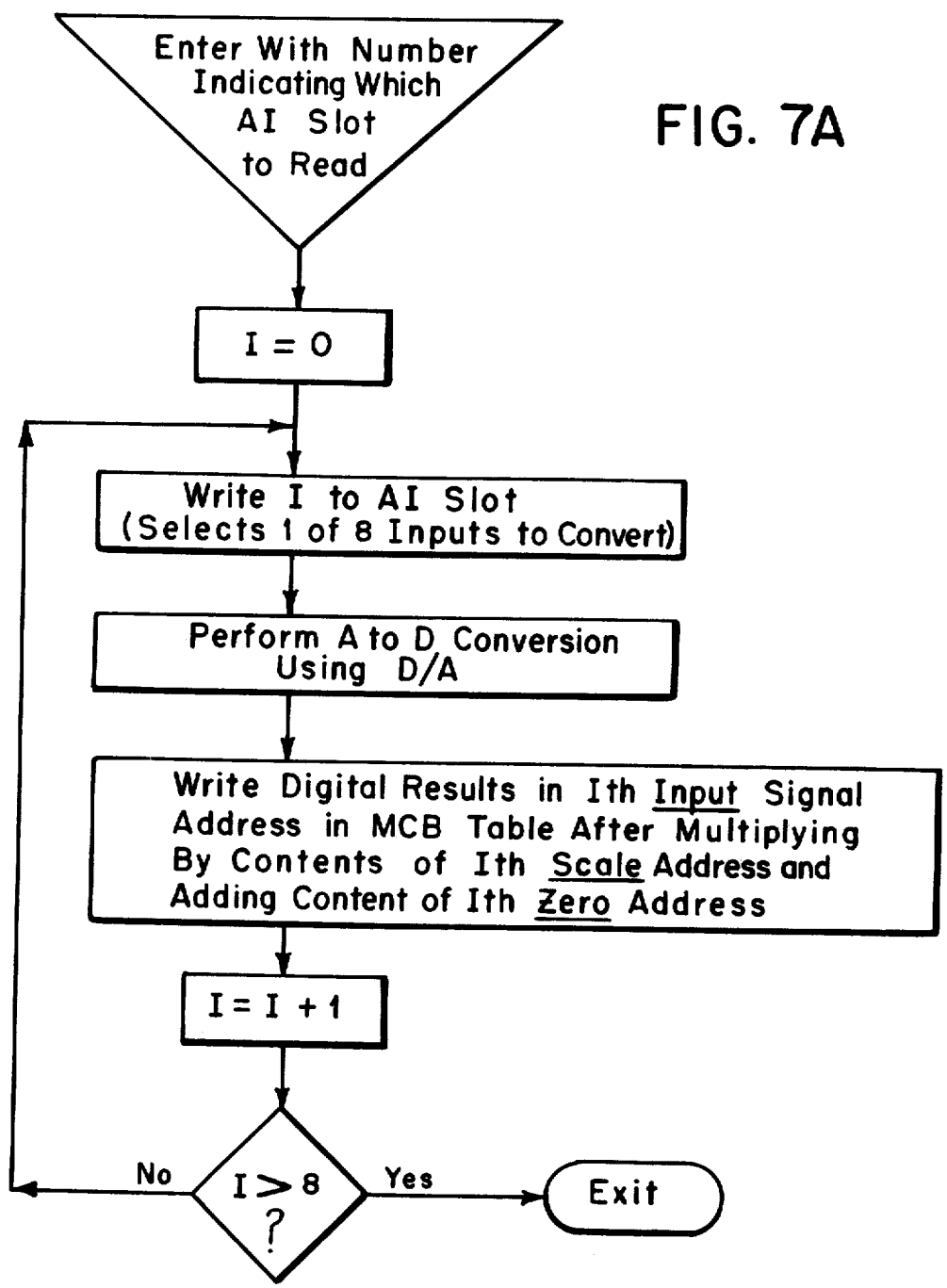
FIGS. 7A through 7Y are flow charts of preferred function block simulation programs and related programs useful in the practice of the invention.

The function selection keys 604 provide input selection keys for specifying a particular input signal to be processed; output selection keys for specifying a particular output path for a process control signal derived from processed input signals, and algorithm selection keys. The input selection keys comprise an Analog In key and a Discrete In key. The Analog In key accepts analog input signals from each of a plurality of analog process sensing devices through their respective paths in the analog input modules. In the preferred embodiment, a specific analog input signal is selected for display or programming by hitting the Analog In key, the keys of the module number, the Input key and and the keys of the terminal number on the module. FIG. 7A is a flow diagram of a preferred Analog Input program, and a preferred data base configuration for the analog input is set forth in Table 2 below. This data base configuration specifies all signals to be used by the simulated terminals of this simulated control block.

TABLE 2.

| Relative Address (Bytes) | Description of Contents |
| --- | --- |
| Start + 0 | Type is Analog Input (8) |
| + 1 | I/O Slot *4 |
| + 2 | Number of Inputs (8) |
| + 4 | Number of Scales (8) |
| + 6 | Number of Zeroes (8) |
| + 7 | Address of Input 1 Signal |
| + 9 | Address of Scale 1 Signal |
| +11 | Address of Zero 1 Signal |
| +13 | Address of Input 2 Signal |
| +15 | Address of Scale 2 Signal |
| +17 | Address of Zero 2 Signal |
| . | . |
| +49 | Address of Input 8 Signal |
| +51 | Address of Scale 8 Signal |
| +53 | Address of Zero 8 Signal |

Figure 7B:
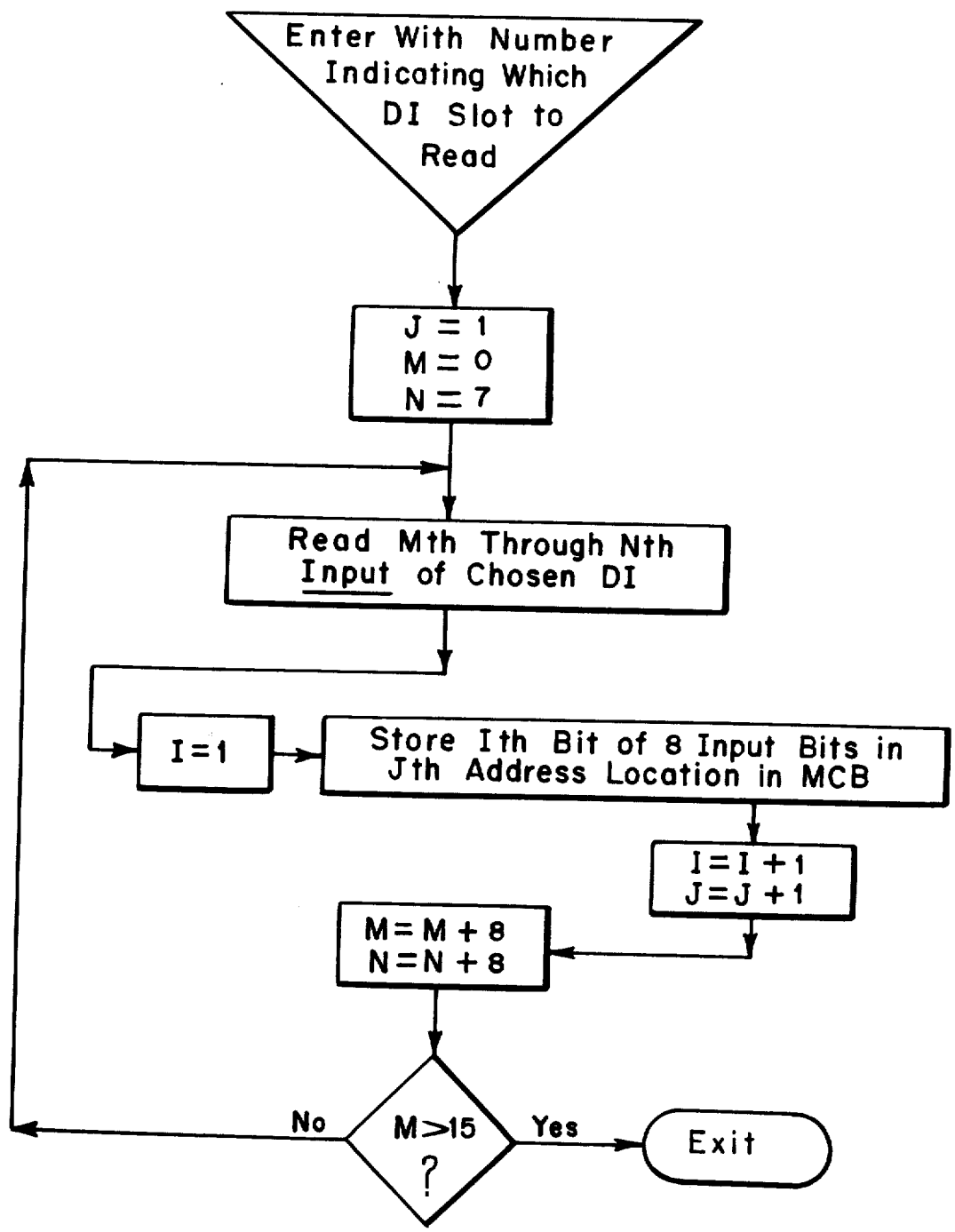

The Discrete In key accepts discrete input signals from each of a plurality of discrete process sensing devices through their respective paths in the discrete input modules, and it assigns each of these signals to respective logic inputs within the computer. A specific discrete input is selected for display or programming by hitting the Discrete In key, the keys for the module number, the Input key and the keys of the terminal number. FIG. 7B is a flow diagram of a preferred discrete input program, and the preferred data base configuration is for the discrete input is set forth in Table 3 below.

TABLE 3.

| Relative Address (Bytes) | Description of Contents |
| --- | --- |
| Start + 0 | Type is Discrete Input (2) |
| + 1 | I/O Slot *4 |
| + 2 | Number of Inputs (16) |
| + 3 | Address of Input & Signal |
| + 5 | Address of Input 2 Signal |
| + 7 | Address of Input 3 Signal |
| . | . |
| +34 | Address of Input 16 Signal |

Figure 7C:
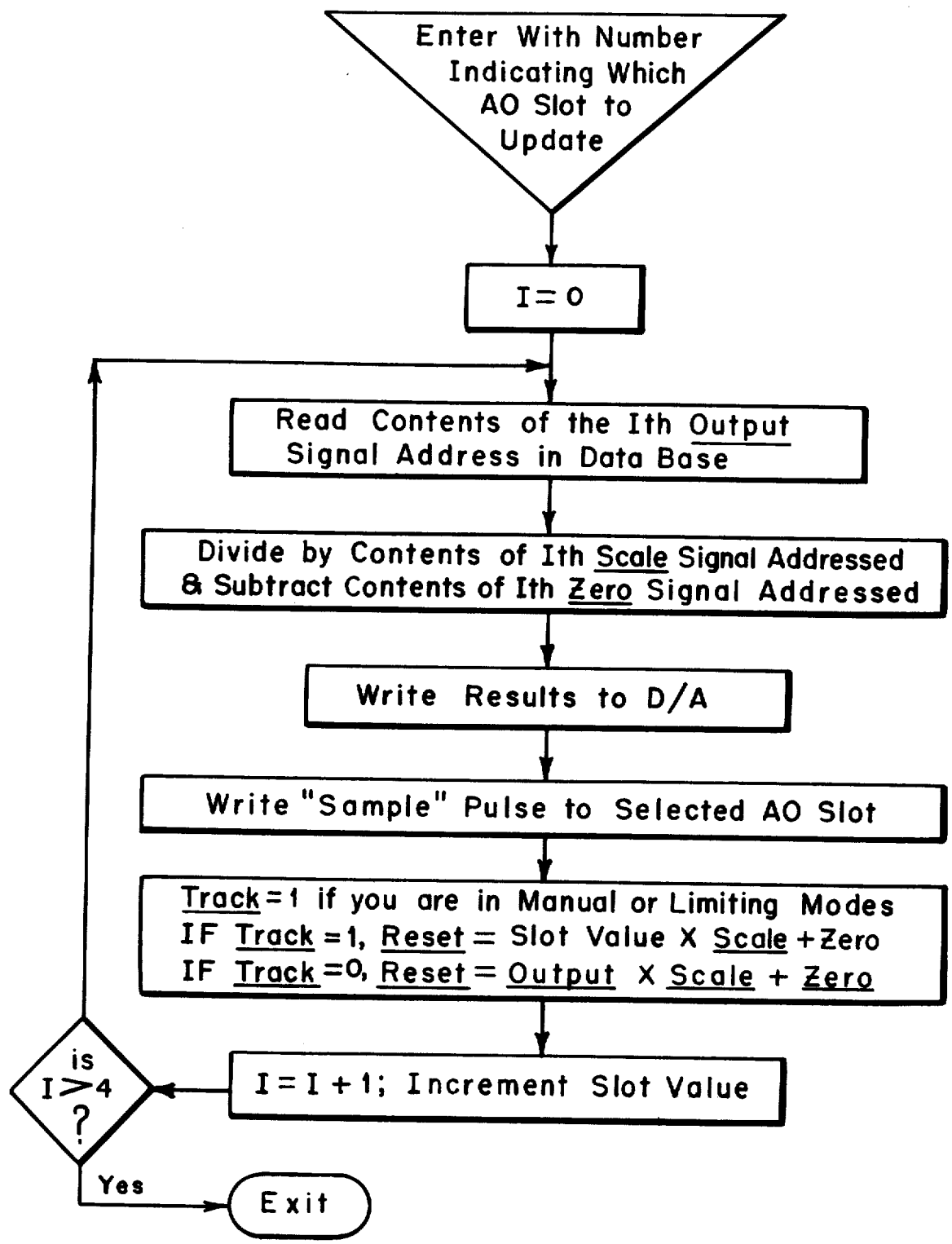

The output selection keys includes an Analog Out key. By this key, respective analog output signals are selected for display or programming. A specific analog output is selected by hitting the Analog Out key, the keys for the module number, the Output key and the keys for the terminal number. FIG. 7C is a flow diagram of a preferred analog output program, and the preferred data base configuration is set forth in Table 4 below.

TABLE 4

| Relative Address (Bytes) | Description of Contents |
| --- | --- |
| Start +0 | Type is Analog Output (17) |
| +1 | I/O Slot *4 |
| +2 | Number of Resets (4) |
| | Number of Scales (4) |
| | Number of Zeros (4) |
| | Number of Outputs (4) |
| +11 | Number of Tracks (4) |
| | Address of Reset 1 Signal |
| +13 | Address of Scale 1 Signal |
| +15 | Address of Zero 1 Signal |
| +17 | Address of |

TABLE 4-continued

| Relative Address (Bytes) | Description of Contents |
| --- | --- |
| | Output 1 Signal |
| +19 | Address of Track 1 Signal |
| . | . |
| +41 | Address of Reset 4 Signal |
| +43 | Address of Scale 4 Signal |
| +45 | Address of Zero 4 Signal |
| +47 | Address of Output 4 Signal |
| +49 | Address of Track 4 Signal |

The output selection keys also include a Discrete Out key permitting selection of respective discrete output signals for display or programming. A specific discrete output signal is selected by hitting the Discrete Out key, the keys for the module number, the Output key and the keys for the terminal number. FIG. 7D is a flow diagram of a preferred discrete output program. The preferred data base configuration is set forth in Table 5, below.

TABLE 5.

| Relative Address (Bytes) | Description of Contents |
| --- | --- |
| Start + 0 | Type - Discrete Output (3) |
| + 1 | I/O Slot *4 |
| + 2 | Number of Outputs (16) |
| + 3 | Address of Output 1 Signal |
| + 5 | Address of Output 2 Signal |
| + 7 | Address of Output 3 Signal |
| . | . |
| +34 | Address of Output 16 Signal |

The algorithm selection keys permit the process control engineer to select one or more digitally simulated analog and discrete control blocks and associated simulated terminals for processing selected input signals. In the preferred embodiment illustrated in FIG. 6, these keys are backlighted, and many serve multiple purposes. The upper legend on the keys identifies their control block simulation function and the lower legend, if any, indicates any simulated terminal which they also control. Several simulated blocks act as if they were analog or discrete process blocks of the type used in conventional hard wire control circuits. The simulated control blocks and their associated terminals can be selected by the following keys.

Figure 7E:
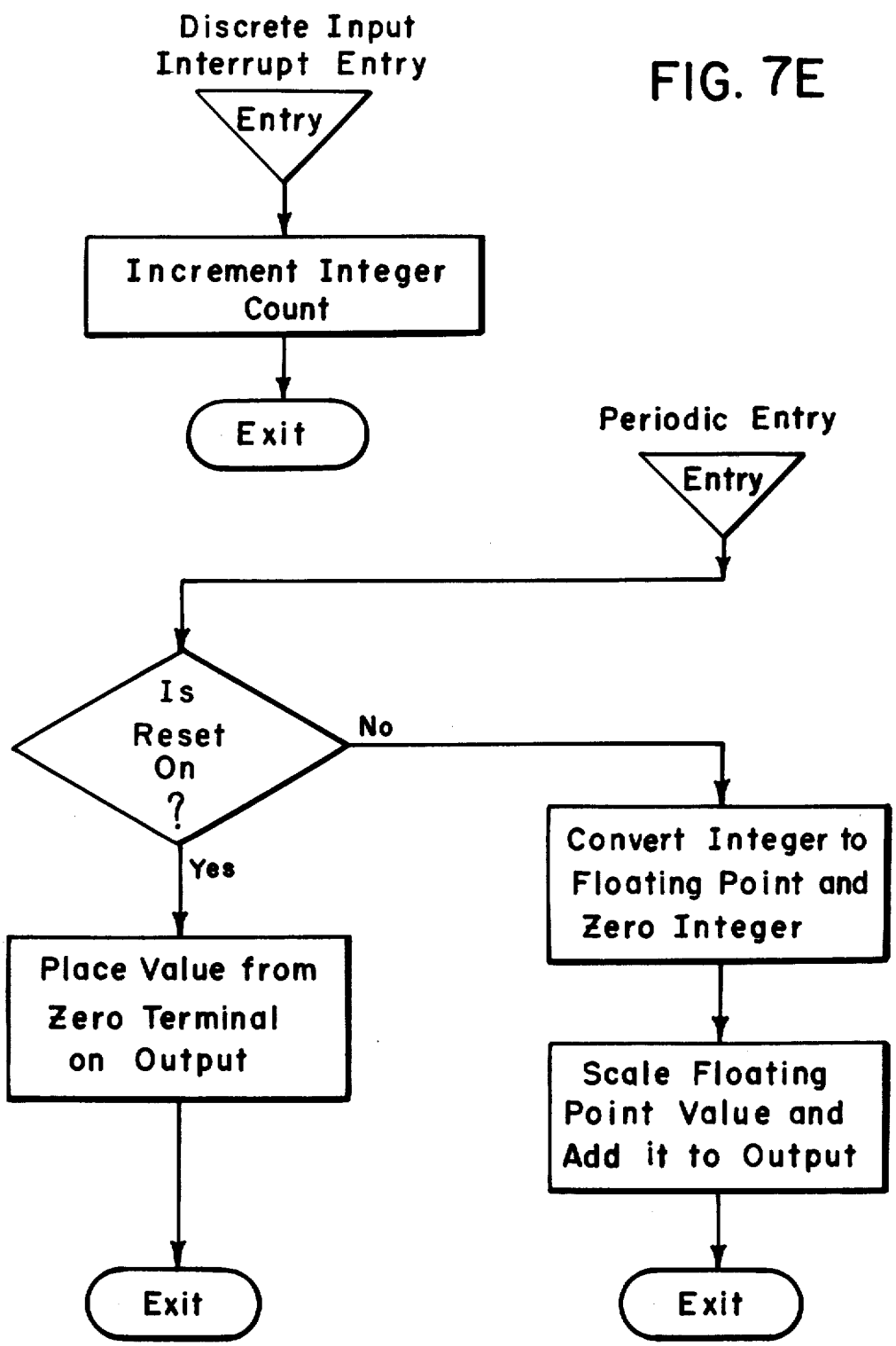

The Counter key permits selection of a simulated control block which will: (1) count the number of pulses that occur in a selected discrete input signal; (2) multiply the total by a scale factor entered under the Scale key; (3) add a term to the product entered under the Zero key, and (4) periodically present the sum to a selected output. FIG. 7E is a flow diagram of a preferred Counter program, and a preferred data base configuration is set forth in Table 6, below.

TABLE 6.

| Relative Address (Bytes) | Description of Contents |
| --- | --- |
| Start + 0 | Type - Counter |
| + 1 | I/O slot *4 |
| + 2 | Bit number (0 - 15) |
| + 3 | Integer count |

TABLE 6.-continued

| Relative Address (Bytes) | Description of Contents |
|---|---|
| + 5 | Address of Output Signal |
| + 7 | Address of Scale Signal |
| + 9 | Address of Zero Signal |
| +11 | Address of Reset Signal |

Figure 7F:
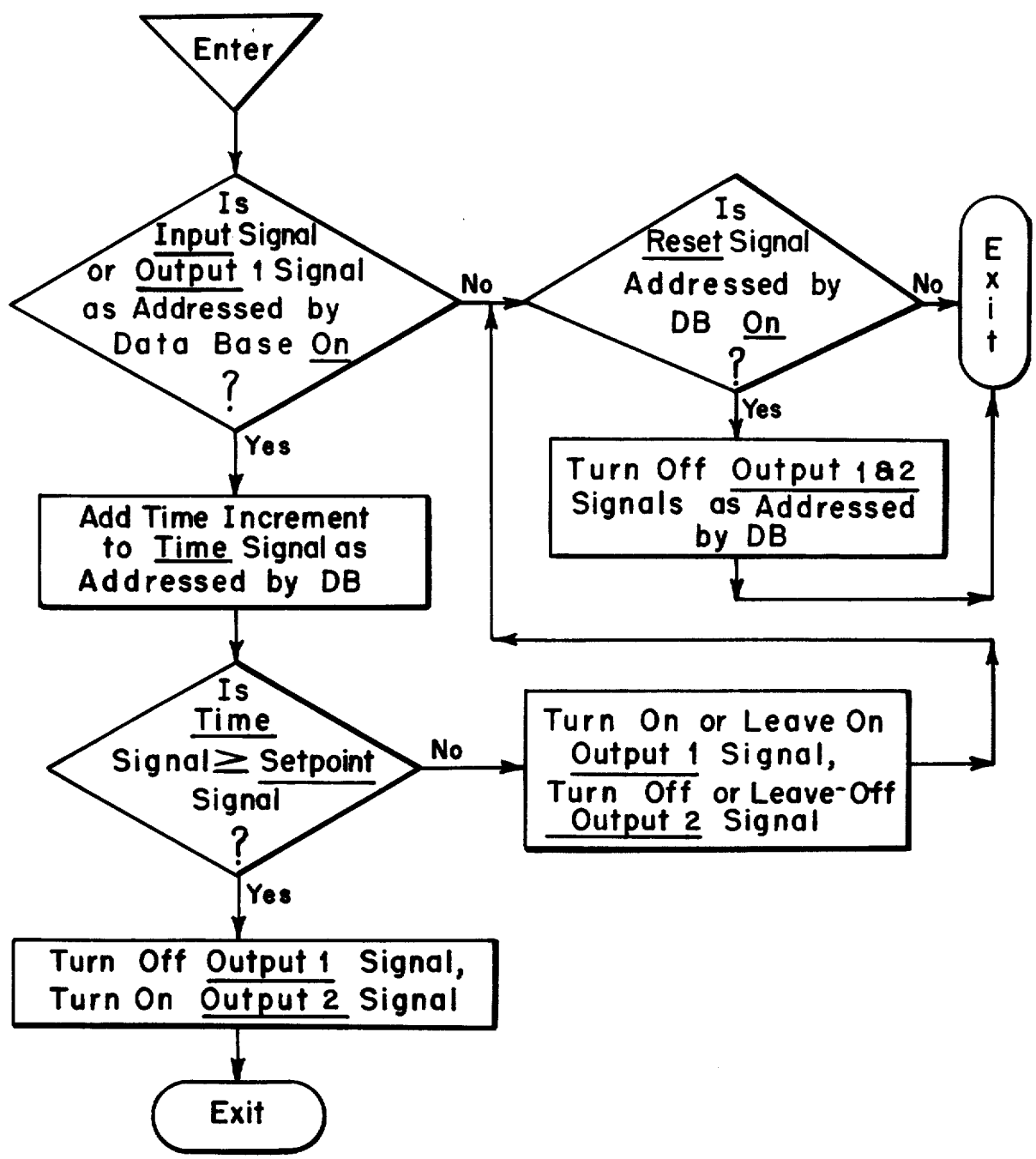

The Timer key permits selection of a simulated control block which provides for an output read under Output 1 a pulse output of a duration entered under the Setpoint key or provides for an output read under Output 2 a signal delay of the duration entered under the Setpoint key. FIG. 7F is a flow diagram of a preferred Timer program. A preferred data base configuration is set forth in Table 7 below.

TABLE 7.

| Relative Address (Bytes) | Description of Contents |
|---|---|
| Start + 0 | Type Designation-Timer (4) |
| + 1 | Address of Time Signal |
| + 3 | Address of Setpoint Signal |
| + 5 | Address of Input Signal |
| + 7 | Address of Reset Signal |
| + 9 | Number of Outputs (2) |
| +10 | Address of Ouput 1 Signal |
| +12 | Address of Ouput 2 Signal |
| +14 | Storage Area |

Figure 7G:
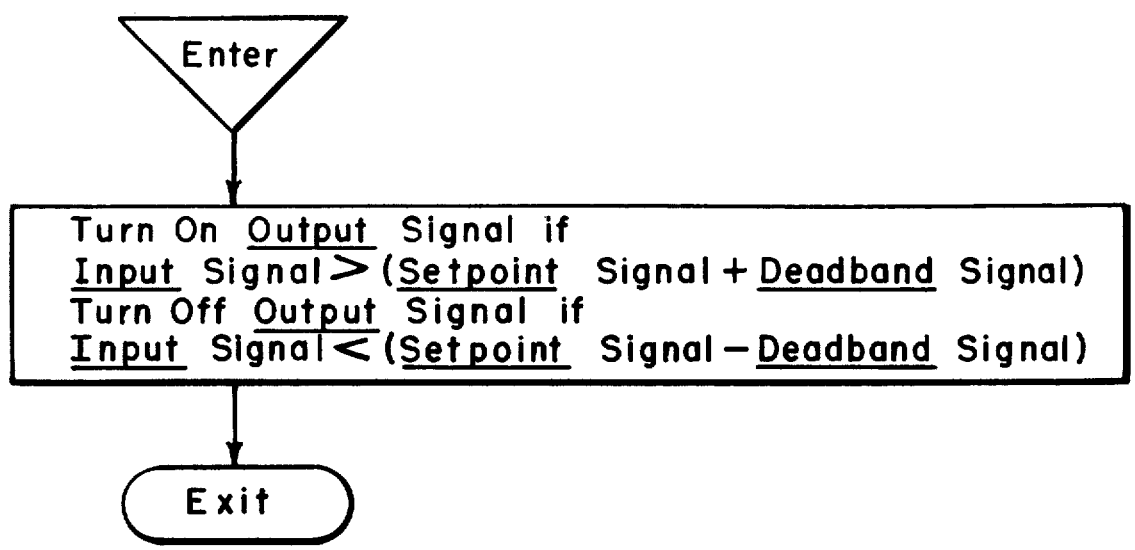

The Comparator key permits selection of a simulated control block which compares an analog input signal to a signal entered under the Setpoint key and provides a digital output signal indicating which of the two is greater when the difference exceeds an amount entered under the DEADBAND key. FIG. 7G is a flow diagram of a preferred Comparator program and a preferred data base configuration is set forth in Table 8 below.

TABLE 8

| Relative Address (Bytes) | Description of Contents |
|---|---|
| Start + 0 | Type Designation Comparator |
| + 1 | Address of Input Signal |
| + 3 | Address of Setpoint Signal |
| + 5 | Address of Deadband Signal |
| + 7 | Address of Output Signal |

Figure 7Q:
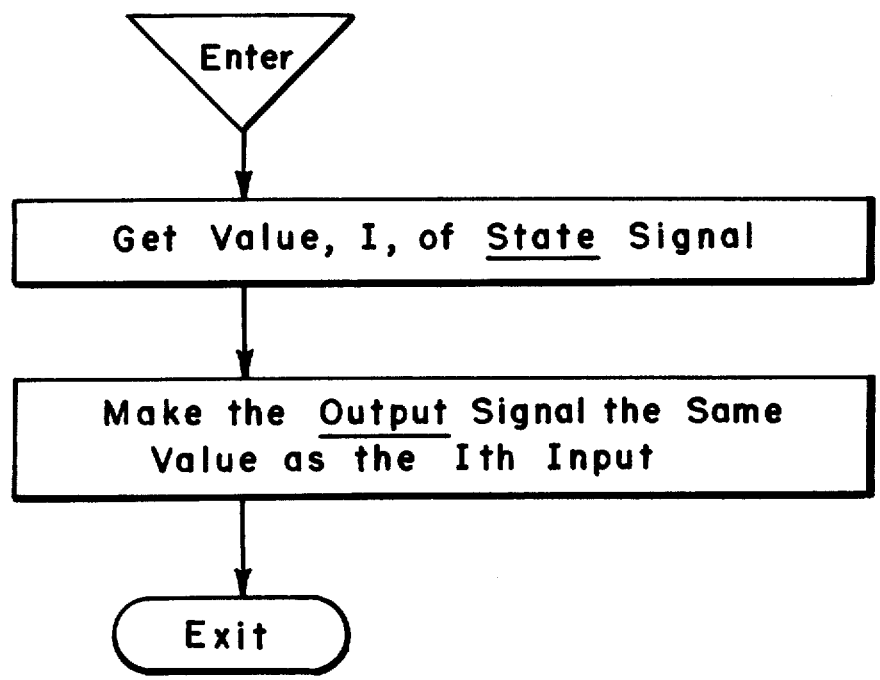
Figure 7H:
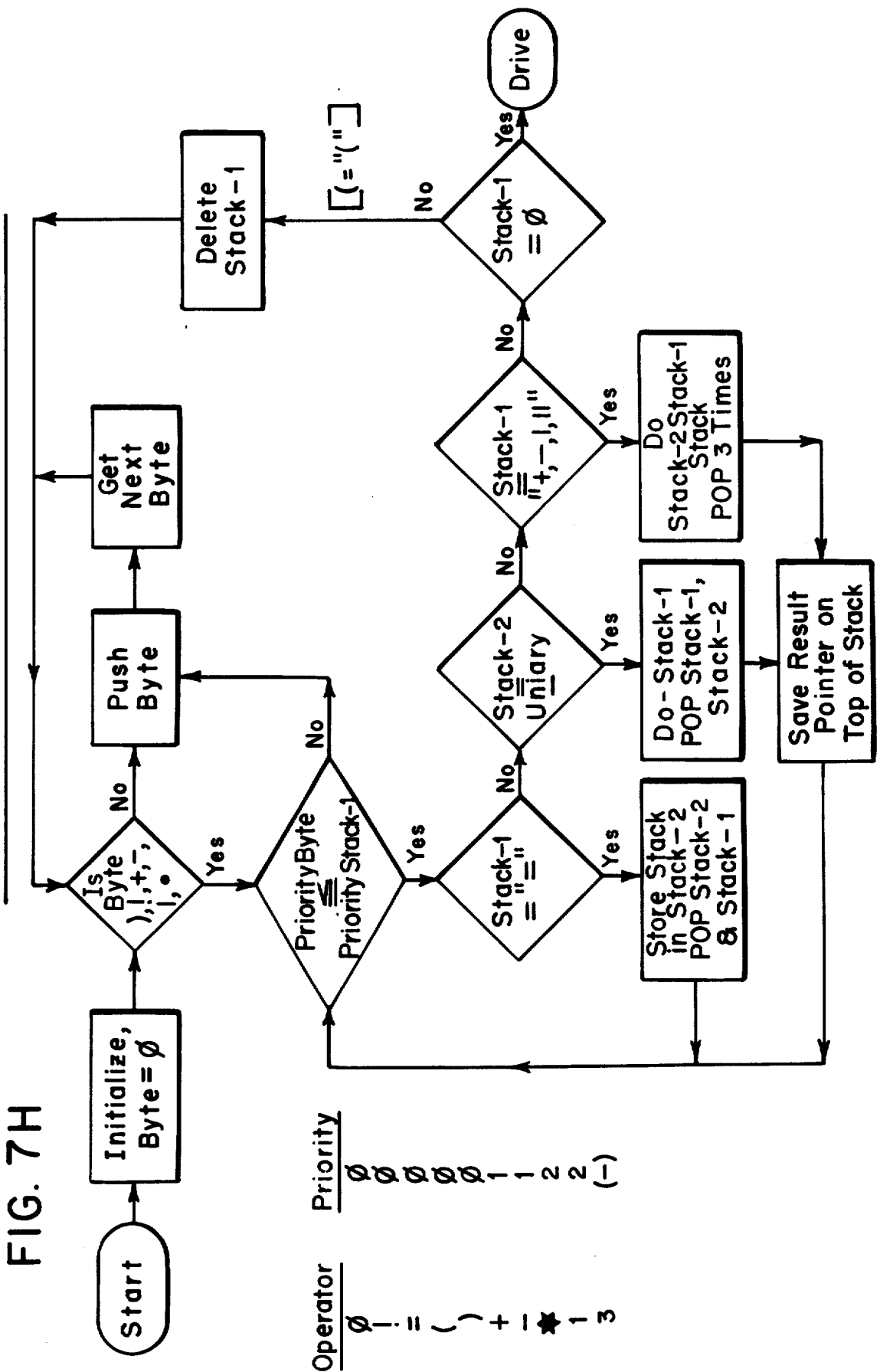

The Logic key permits the process control engineer to couple discrete signals to other discrete signals through Boolean logic equations entered under the Equation key. The logical operators available from the numeric entry and miscellaneous keys include "−" for logical negation, ". " for logical AND, "+" for logical OR, left and right parentheses for imbedding operations, "=" for logical equality, and "!" for the end of an equation. FIG. 7H is a flow diagram of a preferred Logic program. A preferred data base configuration is set forth in Table 9 below.

TABLE 9.

| Relative Address (Bytes) | Description of Contents |
|---|---|
| Start + 0 | Type Designation - Logic (6) |
| + 1 | Address of Equation Area (start +11+2*n) |
| + 3 | Storage Area |
| + 5 | Number of Input/Outputs (n) |
| + 6 | Address of Input/Output 1 |
| + 7 | Address of Input/Output 2 |

TABLE 9.-continued

| Relative Address (Bytes) | Description of Contents |
|---|---|
| ... | ... |
| + 5+2*n | Address of Input/Output n |
| + 11+2*n | Equation Area Byte 1 |
| | Equation Area Byte 2 |
| | Equation Area Byte 3 |
| ... | ... |
| + 10+2*17*m | Equation Area Byte M |

The Calculator key permits the process control engineer to couple analog signals to other analog signals through simple arithmetic equations entered under the Equation key. The arithmetical operators available are "+" for add, "−" for subtract, ". " for multiply, and "÷" for divide, as well as "( )" for embedding, "=" for equality and "!" for the end of an equation. Square roots, trigonometric functions and exponential functions can optionally be provided by using recursion formulas or polynomial series. The flow diagram for the preferred calculator program is the same as that for the logic program shown in FIG. 7H. A preferred data base configuration is set forth in Table 10, below.

TABLE 10.

| Relative Address (Bytes) | Description of Contents |
|---|---|
| Start + 1 | Type Designation - Calculator (14) |
| + 1 | Address of Equation Area (start +11+2*n) |
| + 3 | Storage Area |
| + 5 | Number of Input/Outputs (n) |
| + 6 | Address of Input/Output 1 |
| + 7 | Address of Input/Output 2 |
| ... | ... |
| + 5+2*n | Address of Input/Output n |
| + 11+2*n | Equation Area Byte 1 |
| | Equation Area Byte 2 |
| | Equation Area Byte 3 |
| ... | ... |
| + 10+2*n+m | Equation Area Byte m |

The Sequencer key permits selection of a simulated control block which will sequentially transmit a selected input to each of a plurality of selected outputs upon successive activation of the Strobe simulated terminal. FIG. 7I is a flow diagram of the preferred sequencer program, and a preferred data base confirguration is set forth in Table 11, below.

TABLE 11

| Relative Address (Bytes) | Description of Contents |
|---|---|
| Start + 0 | Type Designation-Sequencer (5) |
| + 1 | Address of Strobe Signal |
| + 3 | Address of State Signal |
| | Storage Area |
| + 7 | Number of Inputs (7) |
| + 9 | Number of Outputs (7) |
| +10 | Address of Input 1 |
| +12 | Address of Output 1 |
| +14 | Address of Input 2 |
| +16 | Address of Output 2 |
| ... | ... |
| ... | ... |
| | Address of Input n |
| | Address of Output n |

Figure 7J:
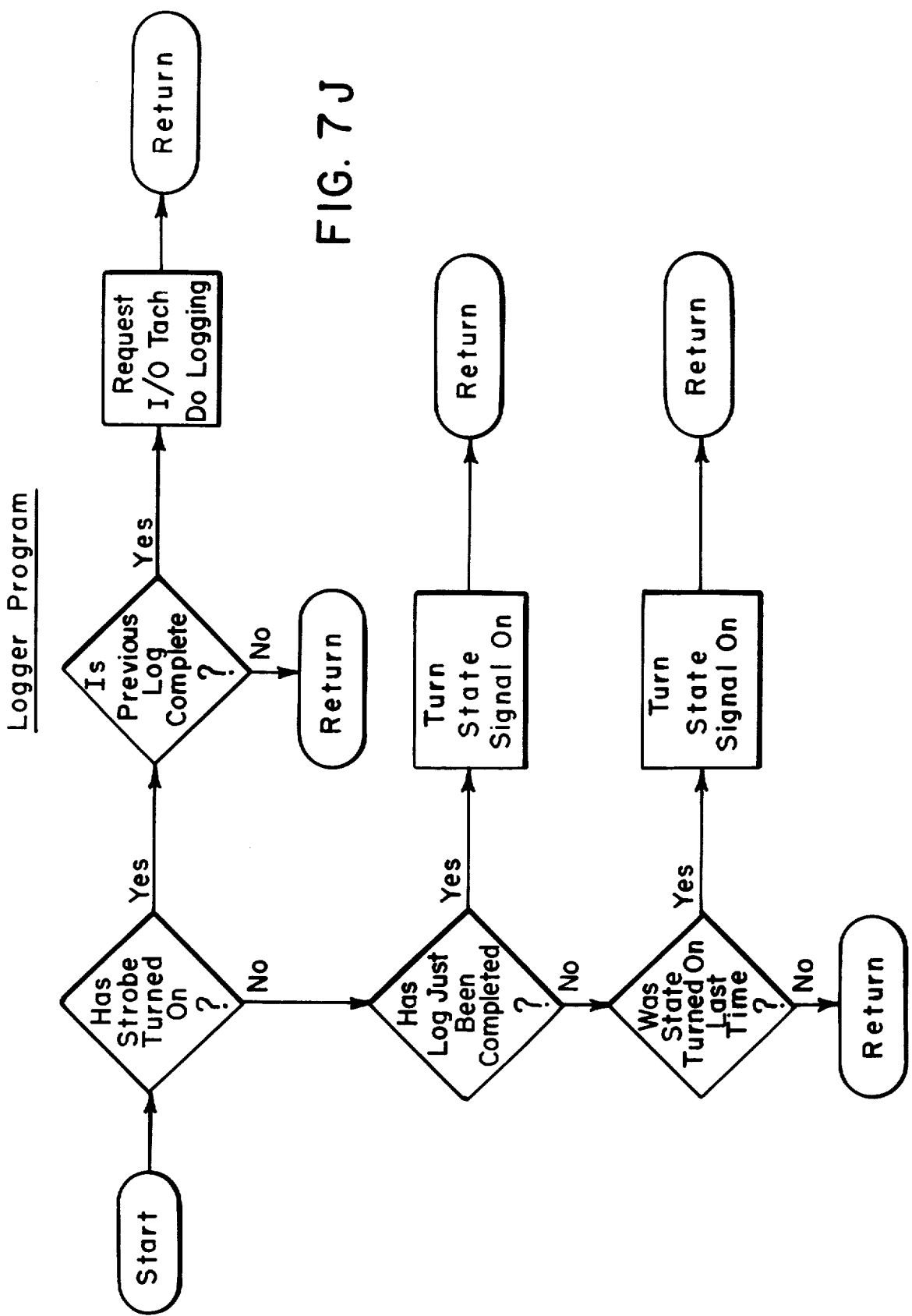

The Logger key permits the process control engineer to have analog or discrete signals printed out on an accessory teletype in accordance with a predetermined format. FIG. 7J is a flow diagram of a preferred Logger program. A preferred data base configuration is set forth in Table 12, below.

TABLE 12.

| Relative Address (Bytes) | Description of Contents |
|---|---|
| Start + 0 | Type Designation-Logger (7) |
| + 2 | Address of Reset Signal |
| + 8 | Address of Strobe Signal |
| +13 | Status Bit + 4 * I/O Slot |
| +14 | Address of Format Data |
| +16 | Address of Input List |
| +18 | Number of Inputs (n) |
| +19 | Address of Input Signal 1 |
| ... | ... |
| +18+2*n | Address of Signal n |

Figure 7K:
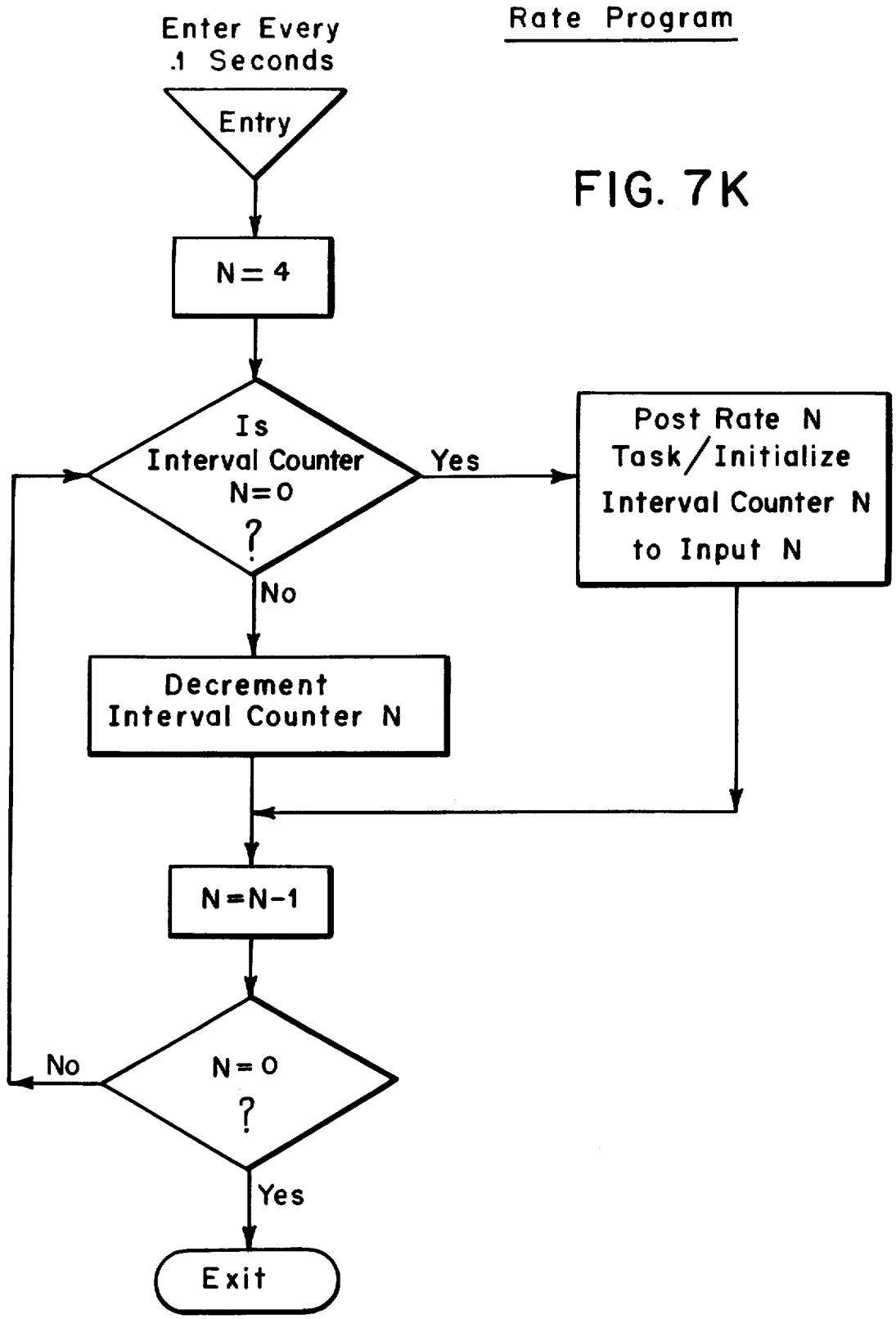

The Rate key permits selection of a simulated control block, useful in setting up simulated control circuits, which permits specification of time between subsequent executions of each simulated control block. FIG. 7K is a flow diagram of a preferred Rate program. A preferred data base configuration is set forth in Table 13, below.

TABLE 13.

| Relative Address (Bytes) | Description of Contents |
|---|---|
| Start + 0 | Type Designator Rate |
| + 1 | Number of Inputs (4) |
| + 2 | Address of Input 1 |
| + 4 | Address of Input 2 |
| + 6 | Address of Input 3 |
| + 8 | Address of Input 4 |

Figure 7L:
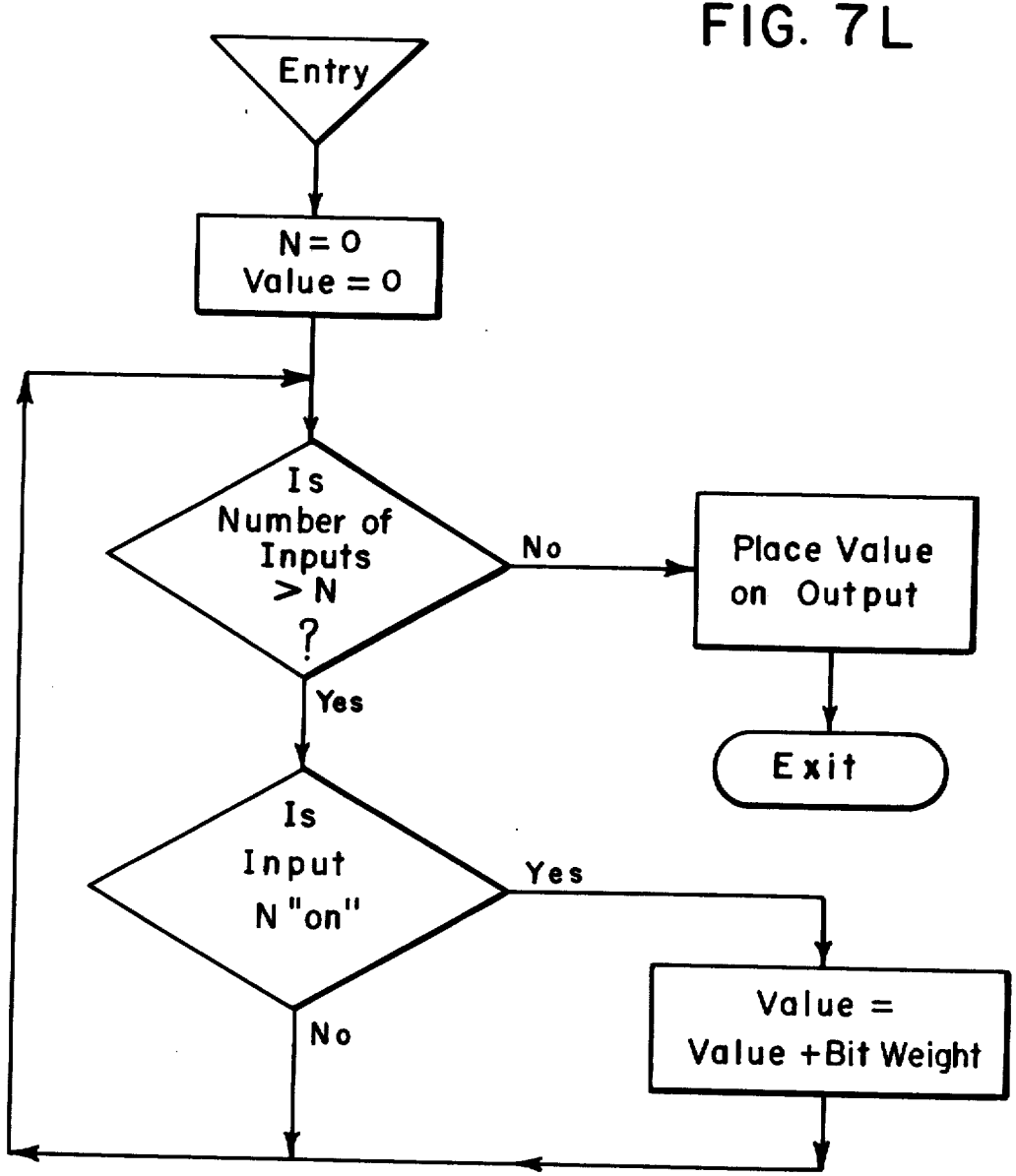

The BCD to Bin key converts input signals comprising binary coded digital signals to analog output signals. FIG. 7L is a flow diagram of a preferred BCD to Binary program, and a preferred data base configuration is set forth in Table 14, below.

TABLE 14.

| Relative Address | Description of Contents |
|---|---|
| Start + 0 | Type Designation - BCD - BIN |
| + 1 | Temporary Storage |
| + 3 | Address of Output |
| + 5 | Number of Inputs |
| + 6 | Address of Input 1 |
| + 8 | Address of Input 2 |
| . | . |
| + N | Address of Input N |

Figure 7M:
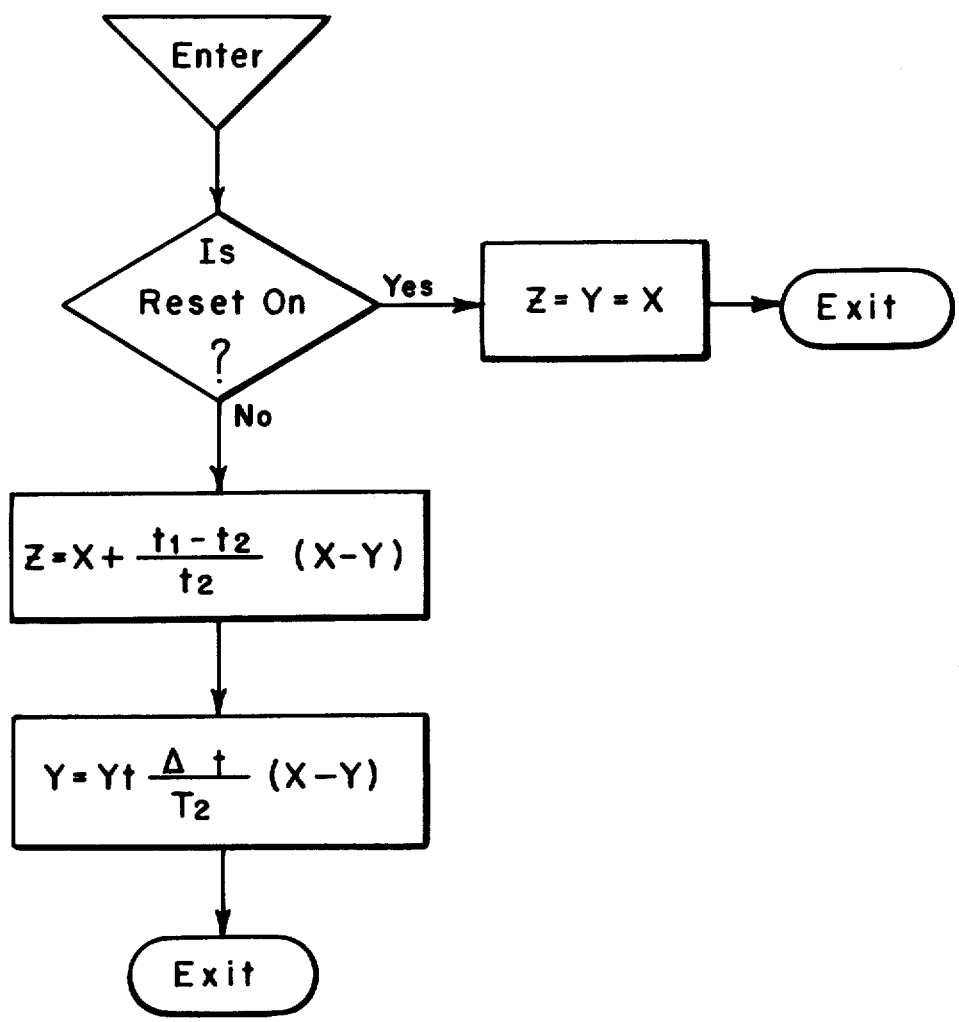

The Lead-Lag key permits selection of a simulated control block which applies a lead or a lag to an analog input signal for implementation of feed-forward control, process modeling, or filtering. The amount of lead (in minutes) is entered under the Derivative key. The amount of lag in minutes is entered under the Integral key. The Lead-Lag process can be disabled by the Track key which causes the output to track the input. FIG. 7M is a flow diagram of a preferred Lead-Lag program. A preferred data base configuration is set forth in Table 15, below.

TABLE 15.

| Relative Address (Bytes) | Description of Contents |
|---|---|
| Start + 0 | Type Designation-Lead/Lag (18) |
| + 1 | Address of Reset Signal |
| + 3 | Address of Lead Signal |
| + 5 | Address of Lag Signal |
| + 7 | Address of Input Signal |
| + 9 | Address of Output Signal |
| +11 | Internal Storage Area |

Figure 7N:
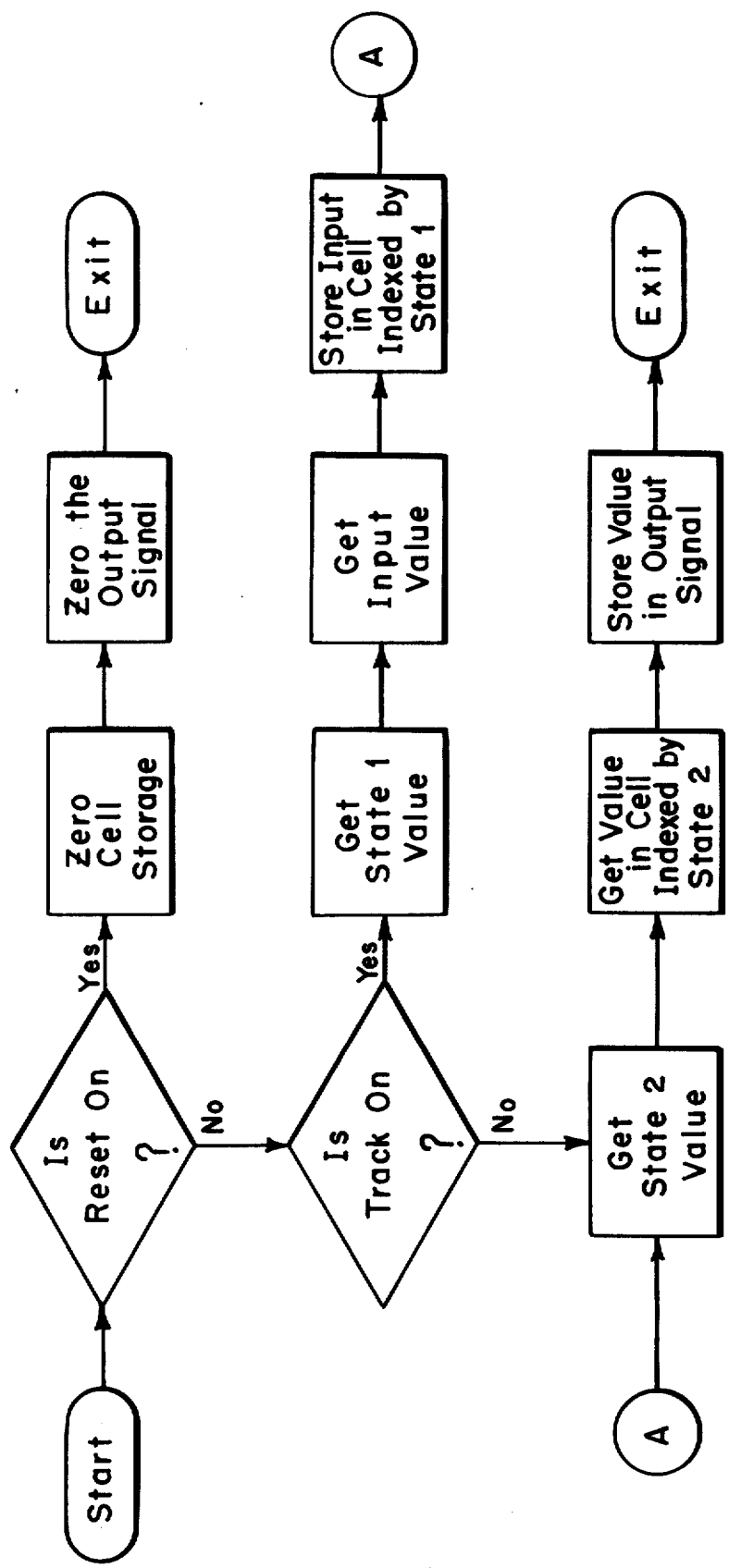

The Track/Hold key permits selection of a simulated control block which receives an analog input signal and stores it in memory until it is selected by a signal entered under the simulated terminal terminal State for presentation to a selected output. A flow diagram of a preferred Track-Hold program is illustrated in FIG. 7N. A preferred data base configuration is set forth in Table 16, below.

TABLE 16.

| Relative Address (Bytes) | Description of Contents |
|---|---|
| Start + 0 | Type Designation-Track/Hold |
| + 1 | Number of Storage cells (n) |
| + 2 | Address of Reset Signal |
| + 4 | Address of Track Signal |
| + 6 | Address of Input Signal |
| + 8 | Address of Output Signal |
| +10 | Number of State Signals (2) |
| +11 | Address of State 1 Signal |
| +13 | Address of State 2 Signal |
| +15 | Storage of Old Reset |
| +16 | Storage Area For Inplementation of Memory Feature. |
| +15+4n | |

The Integrator key permits selection of a simulated control block which integrates an analog input signal with respect to time. FIG. 7(O) is a flow diagram of a preferred Integrator program. A preferred data base configuration is set forth in Table 17, below.

TABLE 17.

| Relative Address (Bytes) | Description of Contents |
|---|---|
| Start + 0 | Type Designation - Integrator |
| + 1 | Address of Input |
| + 3 | Address of Reset |
| + 5 | Address of Output |

Figure 7P:
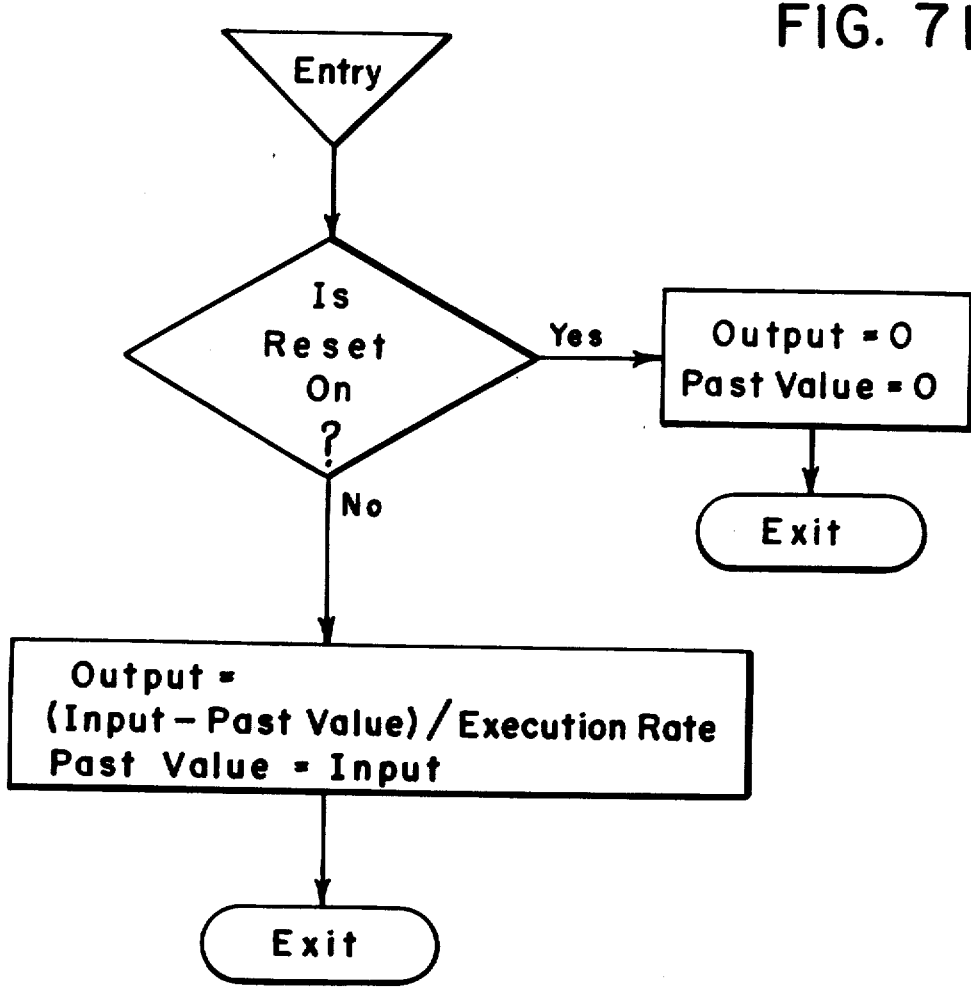

The Differentiator key permits selection of a simulated control block which differentiates an analog input signal with respect to time. FIG. 7P is a flow diagram of a preferred Differentiator program. A preferred data base configuration is set forth in Table 18, below:

TABLE 18.

| Relative Address (Bytes) | Description of Contents |
|---|---|
| Start + 0 | Type Designation - Differentiator |
| + 1 | Address of Input |
| + 3 | Address of Output |
| + 5 | Address of Reset |
| + 7 | Los value of Input |

The Multiplexer key permits selection of a simulated control block which selects one of a plurality of input signals for presentation to the output. The selection is entered under the State key. A flow diagram of a preferred Multiplexer program is illustrated in FIG. 7Q. Table 19, below shows a preferred data base configuration.

TABLE 19.

| Relative Address (Bytes) | Description of Contents |
|---|---|
| Start + 0 | Type Designation - Multiplexer |
| + 1 | Address of State |
| + 3 | Address of Output |
| + 5 | Number of Inputs |
| + 6 | Address of Input 1 |
| + 7 | Address of Input 2 |
| + N | Address of Input N |

The Time/Code key generates current time information and also handles the sign-on of users, accepting the user's combination code and restricting the user to read/write access privileges specified for him. Outputs 1 through 4 provide the time of day in seconds, minutes and hours, respectively and Output 5 provides the day in the month or year in days. The user's combination code is entered under the Setpoint key and compared to the allowable combination codes entered under the Input key. The user's access privileges are entered under the Reset key. FIG. 7R is a flow diagram of a preferred Time/Code program and a preferred data base configuration is set forth in Table 20 below.

TABLE 20.

| Relative Address (Bytes) | Description of Contents |
|---|---|
| Start + 0 | Type Designation - Time/Code (11) |
| + 1 | Address of Setpoint Signal |
| + 3 | Number of Output Signals (5) |
| + 4 | Address of Output 1 Signal |
| | Address of Output 2 Signal |
| . | . |
| . | . |
| . | Address of Output 5 Signal |
| +16 | Number of Input Signals (3) |
| +18 | Number of Reset Signals (3) |
| | Address of Input 1 Signal |
| | Address of Reset 1 Signal |
| | Address of Input 2 Signal |
| | Address of Reset 2 Signal |
| | Address of Reset 3 Signal |
| | Storage Area |

The Peak Detector key permits selection of a simulated control block which samples an analog input signal, holds the value of the largest input in one or more memories and presents this value to the output. The Track key controls the sampling of the input. The State 1 keys select which of a plurality of memories which the detected peak is to be stored and the State 2 keys select which of a plurality of memories is to have its contents presented at output. A flow diagram of a preferred Peak Detector program is illustrated in FIG. 7S. Table 16, infra, illustrates a preferred data base configuration.

The Averager key permits selection of a simulated control block which can average an analog or a digital input signal. The Averager operates on a signal during a period controlled by the Track key. The State 1 keys control which of a plurality of memories the averaged input is to be stored in and the State 2 keys control which of the memories whose contents are to be presented at the output. The average can be multiplied by a factor entered under the Scale key before it is presented to the output. FIG. 7U is a flow diagram of a preferred Averager program. A preferred data base configuration is set forth in Table 21, below.

Table 21.

| Relative Address (Bytes) | Description of Contents |
|---|---|
| Start + 0 | Type Designation - Averager |
| + 1 | Number of Storage Cells(n) |
| + 2 | Address of Track Signal |
| + 6 | Address of Input Signal |
| + 8 | Address of Output Signal |
| +10 | Number of State Signals (2) |
| +11 | Address of State 1 Signal |
| +13 | Address of State 2 Signal |
| +15 | Address of Scale Signal |
| +17 | Address of Time Signal |
| +19 | Storage Area For Internal Time |
| +23 | Storage Area For Integration Interval |
| +27 | Storage For Old Reset |
| +28 | Current For Old Reset |
| +29 | Storage Area For Input and Integration Values |
| + 28+8n | |

Figure 7V:
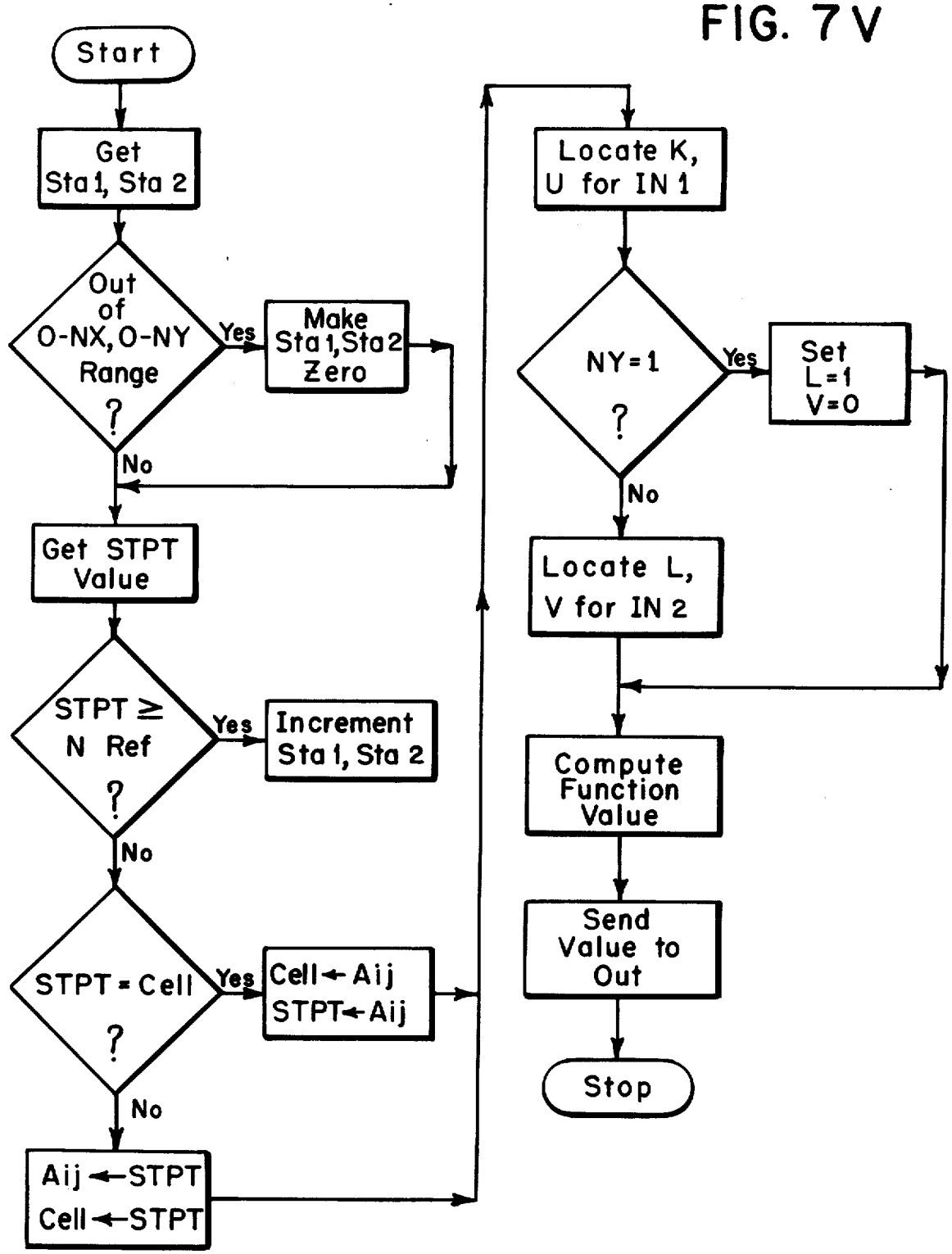

The Function key permits storage of a table of values for a function of one or two variables and, for current input signals corresponding to these variables $(x,y)$, interpolates to find the value of the function $f(x,y)$ and presents this value to the output. FIG. 7V is a flow diagram of a preferred Function program. In the interpolation portion of the program, K,L,U, and V are defined by the relations:

$X_K \leq$ Input $1 < X_{K+1}$;

$Y_L \leq$ Input $2 < Y_{L+1}$;

$$U = \frac{\text{Input } 1 - X_K}{X_{K+1} - X_K} \text{; and}$$

$$V = \frac{\text{Input } 2 - Y_L}{Y_{L+1} - Y_L}$$

A preferred data base configuration is set forth in Table 22, below.

TABLE 22.

| Relative Address (Bytes) | Description of Contents |
|---|---|
| Start + 0 | Type Designation - Function |
| + 1 | Numbers of X entries (NX) |
| + 2 | Number of Y entries (NY) |
| + 3 | Address of Input 1 Signal |
| + 5 | Address of Input 2 Signal |
| + 7 | Address of Output Signal |
| + 9 | Address of state 1 Signal |
| +11 | Address of state 2 Signal |
| +13 | Address of setpoint Signal |
| +15 | Reference MemoryCell (Cell) |
| +19 | Reference Number (NREF) |
| +23 | Intermediate storage of Floating Point Numbers (X, P, Q, R, U, V) |
| +47 | Intermediate storage of B1, B2, and B3. |
| +50 | Storage of table of X, Y, and F (X,Y) valves. |

A preferred data base configuration for the area of the memory which includes the data bases for the various simulated control blocks is set forth in Table 23 below.

TABLE 23

| | |
|---|---|
| 1. | Special processing program address pointer. |
| 2. | Simulated control block directory address pointer. |
| 3. | Process Operator's Panel key identification number for terminal. |
| 4. | Terminal type information, including offset information, interleave level, required terminals special processing and type of signals. |
| 5. | Process Operator's Panel key identification |
| 6. | Terminal Type information. |
| 7. | Addresses of simulated control blocks. |
| 8. | Data base configurations for each respective simulated control block. |

It should be noted that item 8 of Table 23 includes each of the control block data bases set forth in Tables 2 through 22.

Figure 8:
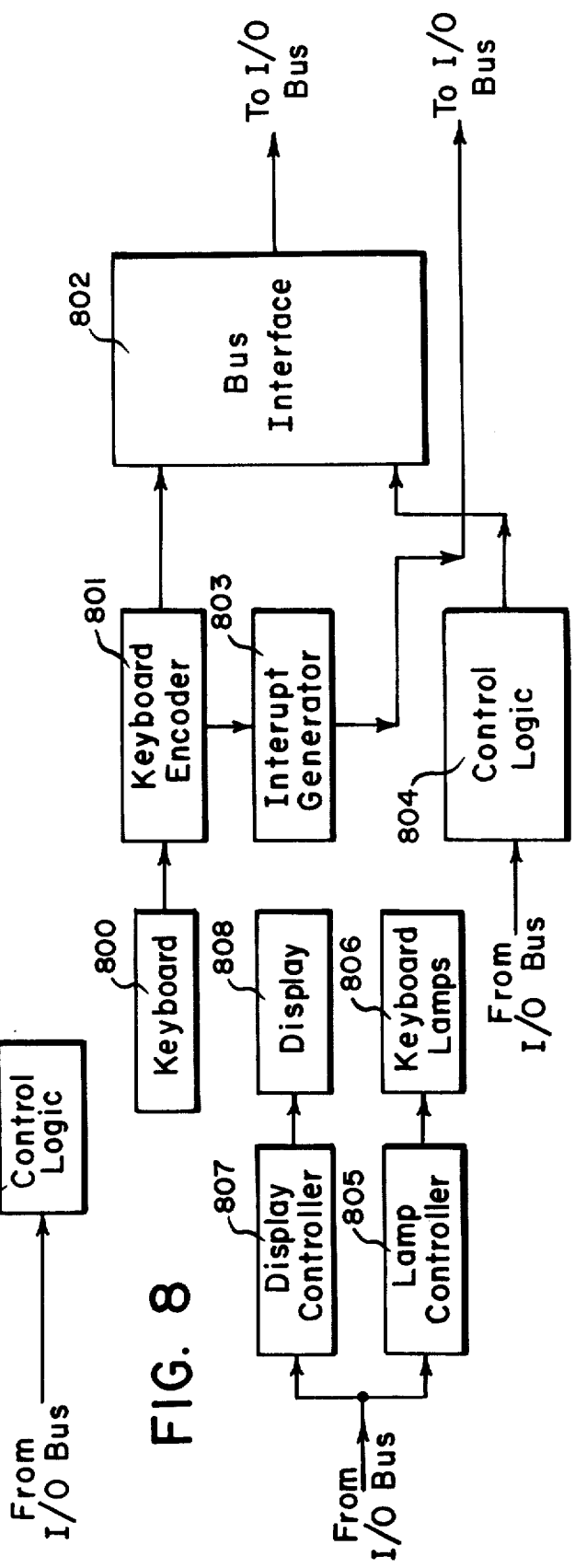
FIG. 8 is a schematic diagram showing the circuitry of the process operator's panel in greater detail.

A preferred circuit arrangement for coupling the process operator's panel to the computer is illustrated in FIG. 8. In substance, the keys of keyboard 800 are connected to keyboard encoder 801. The keyboard encoder converts the hitting of each separate key into a separate ASCII character which is presented to bus interface circuit 802. In addition upon receipt of a key hit signal, the keyboard encoder activates an interrupt generator 803 which sends a high priority message to the computer over the input/output bus. Upon receipt of such an interrupt signal, the computer commands the control logic 804 to effect a scan of the bus interface so that the computer may ascertain which key has been hit. When a backlighted key is hit, the computer, through lamp controller 805, commands backlighting of the appropriate keyboard lamp 806. When a display response is called for, the computer through to display controller 807, commands display 808. In a preferred embodiment, the display is a unit commercially marketed by the Borroughs Company under the product name Self-Scan Display.

The Operation Of The Process Operator's Panel In the Signal Mode

In the preferred embodiment of the invention, the process control engineer can operate the process operator's panel in two different modes. The first mode, referred to as the Signal Mode, is primarily concerned with the processing of signals within the various simulated function blocks; and the second mode, referred to as the System Mode, is primarily concerned the interconnections among the various simulated function blocks. In this embodiment the controller remains in the first of these modes, the Signal Mode, unless the System key is hit.

Figure 7W:
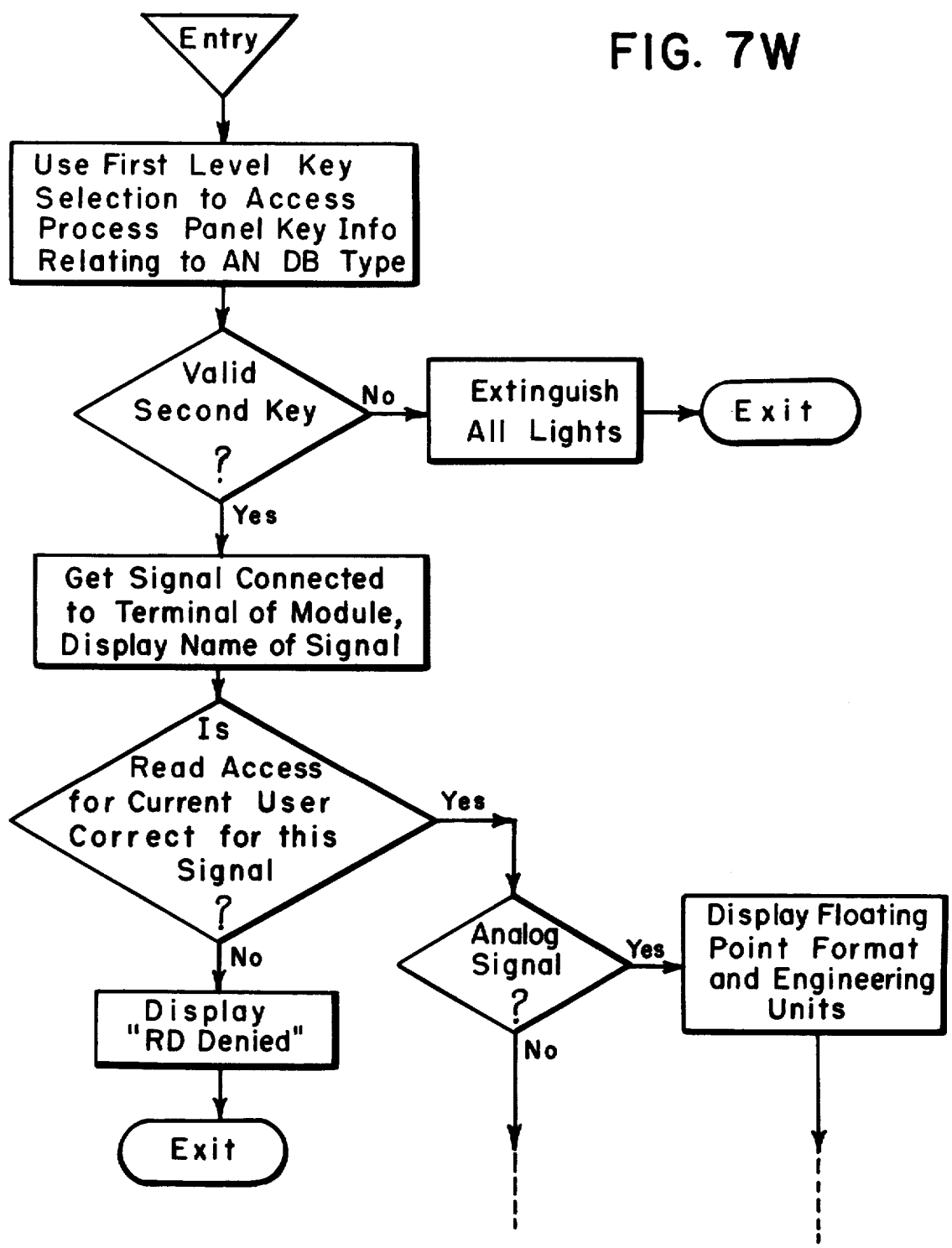
Figure 7X:
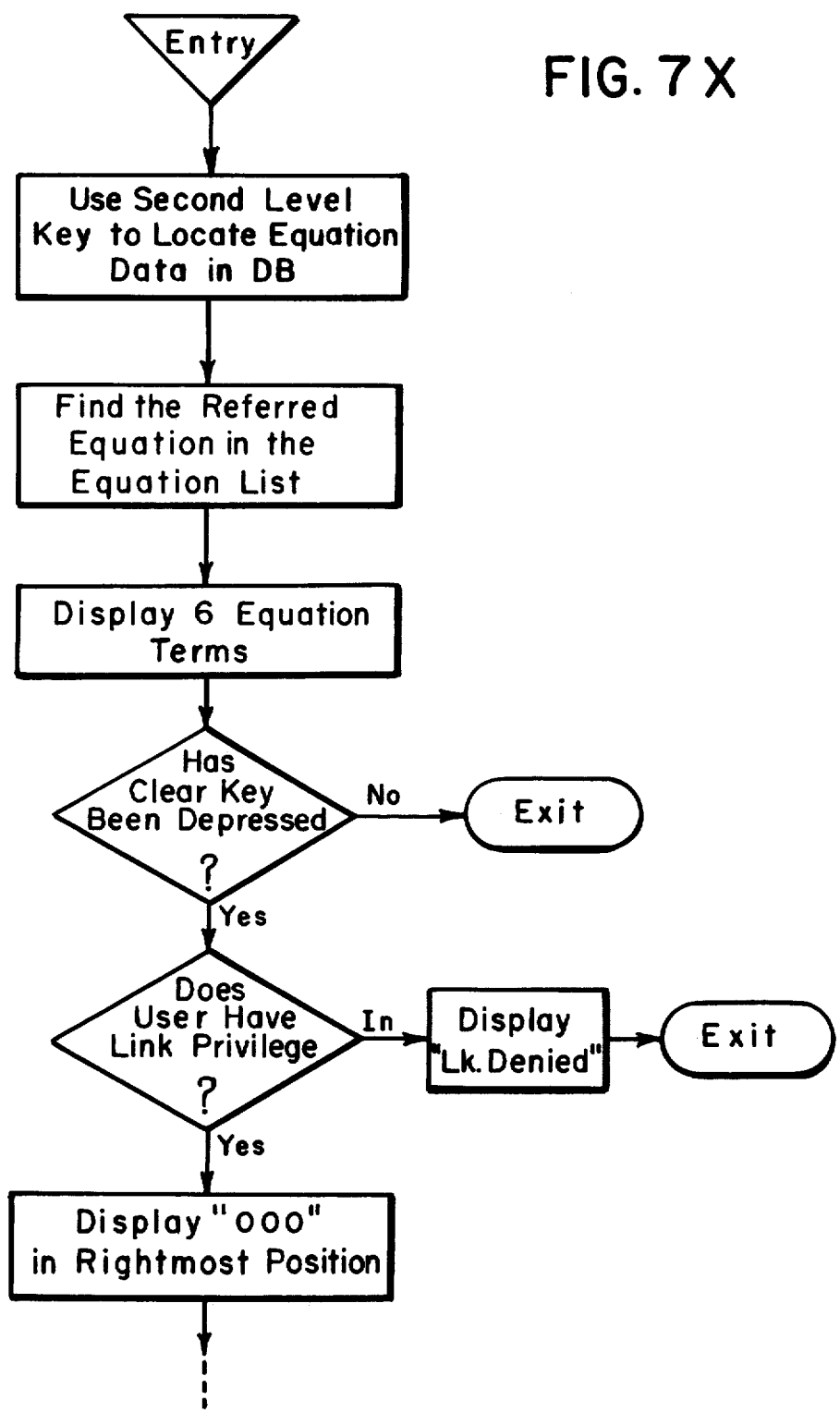

In the Signal Mode, the process control engineer can utilize the process operator's panel to inspect, enter and change various process variables used within the simulated control blocks. FIG. 7W is a flow diagram of a preferred program for permitting inspection, entry and modification within the Signal Mode. The operator can also inspect, enter and change logic and arithmetic equations within the logic and calculator simulated control blocks, respectively. FIG. 7X is a flow diagram of a preferred program for permitting inspection, entry and modification of logic and arithmetic equations.

The operation of the process operator's panel in the Signal Mode may best be illustrated by reference to the following specific examples.

EXAMPLE 1

Examination of a Process Variable

To examine a process variable, e.g. the setpoint on the first simulated comparator block, perform the following steps.

| Step | Purpose |
| --- | --- |
| 1. Hit the keys of the simulated function block with which the process variable is associated, e.g. hit the Comparator and 1 keys. | Selects simulated block in question, e.g. Comparator number 1 |
| 2. Hit the key of the simulated terminal with which the process variable is associated, e.g. hit the Setpoint key. | Selects the simulated terminal to which the process variable in question is applied, e.g. the setpoint terminal. Displays signal name. |
| 3. Hit the Read key. | Effects a display of the current value of the process variable applied to the selected terminal if the user, identified by his sign-on code, has security access to read the variable. |

EXAMPLE 2

Changing The Value of a Process Variable

To enter or change the value of a process variable after performing the steps of Example 1, perform the following steps.

| Step | Purpose |
| --- | --- |
| 1. Hit the Clear key | 20 delete the old value, if any, for the variable in question. |
| 2. Enter the new value for the process variable | Selects new value. |

| Step | Purpose |
| --- | --- |
| 3. Hit the Enter key. | Effects entry of the selected new value if the user has security axis to change the variable. |

EXAMPLE 3

Inspecting An Equation

To inspect a logic equation, e.g. equation for output 2 of simulated logic block number 6, perform the following steps:

| Step | Purpose |
| --- | --- |
| 1. Hit the keys identifying the particular logic block, e.g. the Logic and 6 keys. | Selects particular logic block in which equation located. |
| 2. Hit the keys identifying the particular equation to be inspected, e.g. the the Equation, 2, and Enter keys. | Selects equation. |
| 3. Hit the Read key. | Effects a display of the equation. To read the whole equation, use the slew keys. |

An arithmetic equation is read by substantially the same steps, substituting the Calculator key for the Logic key.

EXAMPLE 4

Entering An Equation

To enter a logic equation, e.g. to specify that the condition of the seventh output terminal is the logical inversion of the the signal on the first input terminal, perform the following steps:

| Step | Purpose |
| --- | --- |
| 1. Perform the steps of Example No. 3 | Selects a specific logic block and a specific equation "terminal" for entry of equation. |
| 2. Hit Clear, 7 = — 1!, and Read keys. | Effects entry and Enter and display of equation setting the 7th output as inverted with respect to the condition of the first input. |

EXAMPLE 5

Changing An Existing Equation

To change an existing arithmetical equation after inspecting it, e.g. to change the equation for output 27 from the product of in puts 9 and 29 to the product of input 9 and the sum of inputs 29 and 7, perform the following steps:

| Steps | Purpose |
| --- | --- |
| 1. Using the slew keys, place 29 at the right edge of the display. | Selects position for subsequent operation. |
| 2. Hit the Clear, (29 & 7). 9 Enter and Read keys. | Replaces old portion of equation with new. |

The Operation of The Process Operator's Panel In the System Mode

The process operator's panel is further provided with means for selecting an arrangement of the above-described simulated control blocks whereby the computer simulates a control circuit comprising the selected arrangement. This selection takes place in the System Mode.

The primary means for arranging the simulated control circuit is the System key which, can be used in conjunction with a plurality simulated "internal signal wires" to permit the configuration, inspection and modification of a simulated control circuit.

The simulated internal signal wires are specified in a portion of the computer memory referred to as the Master Signal Directory (or MSD). For each such "wire", memory space is reserved for recording; (1) the type of signal to be carried, i.e. discrete or analog; (2) the data carried; one byte for discrete signals, four bytes for analog signals; (3) the engineering unit of the signal; (4) the access security of the "wire", which can be high, medium or low for read and write, respectively; and (5) the name of the signal in one to 11 characters. Each internal signal wire is uniquely identified by its number in the Master Signal Directory.

Figure 7Y:
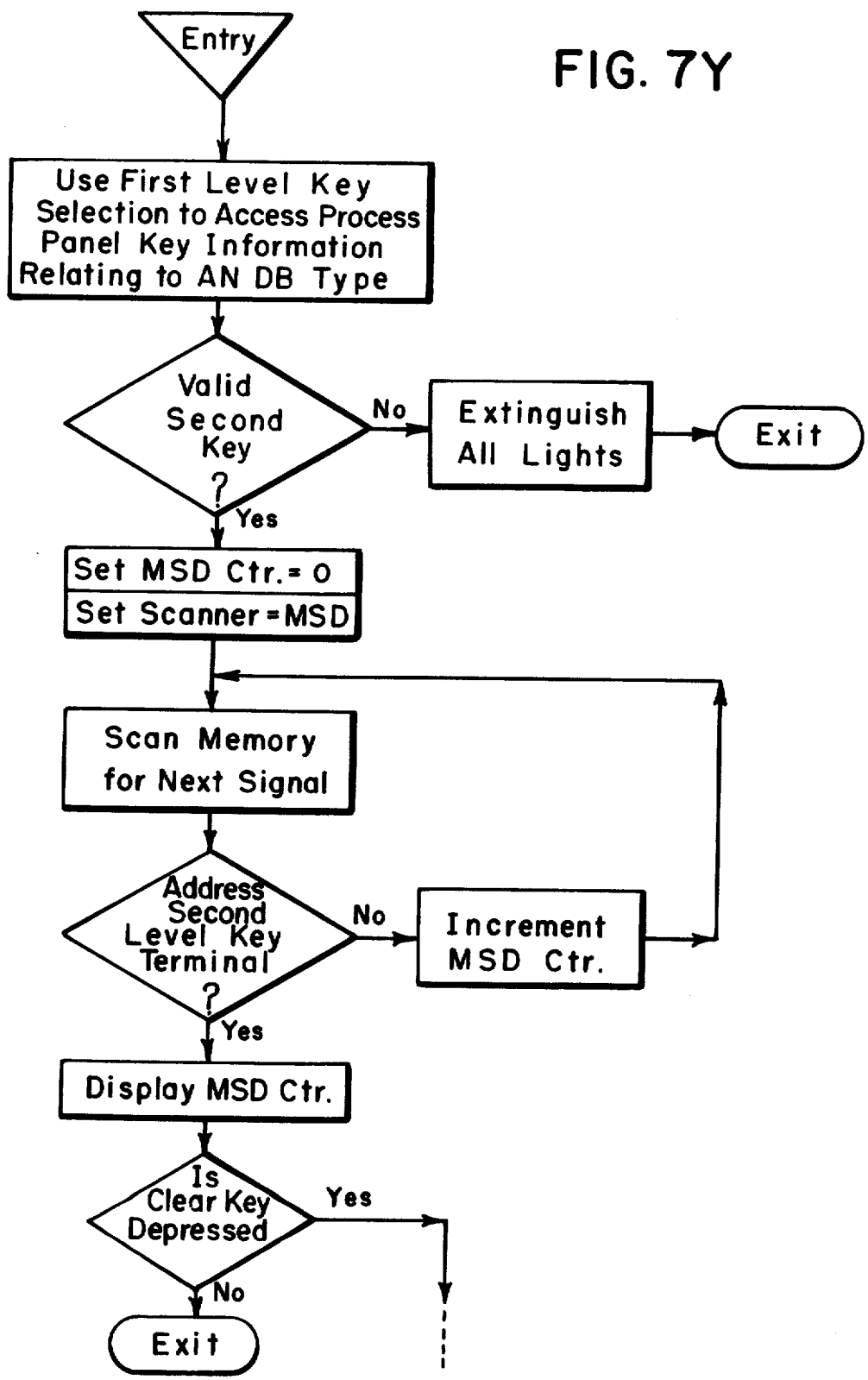

FIG. 7Y is a flow diagram of a operation of the process operator's panel in the system mode. This operation may best be illustrated by reference to the following specific examples.

EXAMPLE 6

Connection Of An Input To A Simulated Control Block To An Output

To connect the fourth analog input of the second analog input module to the compute block, square the input and apply it to the third terminal of the seventh analog output module, perform the following steps:

| Step | Purpose |
|---|---|
| 1. Hit System key | Places the controller in System Mode which permits the process operator to "connect" and "disconnect" simulated internal signal wires. |
| 2. Hit Analog In, 2, Input, 4 and Enter keys | Selects the second analog input module and the fourth input terminal thereof. |
| 3. Hit Read key | Effects a display of the number of any simulated internal signal wire already connected to the specified terminal or "Not Used" if none connected. |
| 4. Hit Clear, 119, and Enter keys. | Disconnects any previously connected "wire" and one end of connects "wire" 119 to the specified terminal. The name of signal 119 is displayed. |
| 5. Hit Calculator 1, Input, 17 and Enter keys | Selects a specific simulated input terminal (the 17th) on a specific calculator control block (the first). |
| 6. Hit Read key | Effects a display of the number of any simulated internal signal wire already connected to specified terminal. |
| 7. Hit Clear, 119, and Enter keys | Disconnects any previously connected "wire" and connects second end of simulated internal signal wire number 119 to specified terminal. |
| 8. Hit Calculator, 1, Output, 6, Enter and Read keys | Selects a specific simulated output terminal (the 6th) of the first Calculator control block and effects a display of any simulated internal signal wire already connected to the specified terminal. |
| 9. Hit Clear, 5, and Enter keys. | Disconnects any previously connected. "wire" and connects one end of simulated internal signal wire number 5 to the specified terminal. |
| 10. Hit Analog Out, 7, Input, 3, Enter, and Read keys. | Selects the third output terminal of the seventh analog output module and effects a display of the number of any simulated internal signal wire already connected thereto. |
| 11. Hit Clear, 5, and Enter keys. | Disconnects any previously connected "wire" and the connects other of simulated internal signal wire number 5 to the specified analog output terminal. |
| 12. Hit System key | Removes controller from the System Mode and puts it into the Signal Mode. |
| 13. Program first calculator block to square input 17 and present the result to output 6, i.e. 6=17.17!. | |

EXAMPLE 7

Figure 9A:
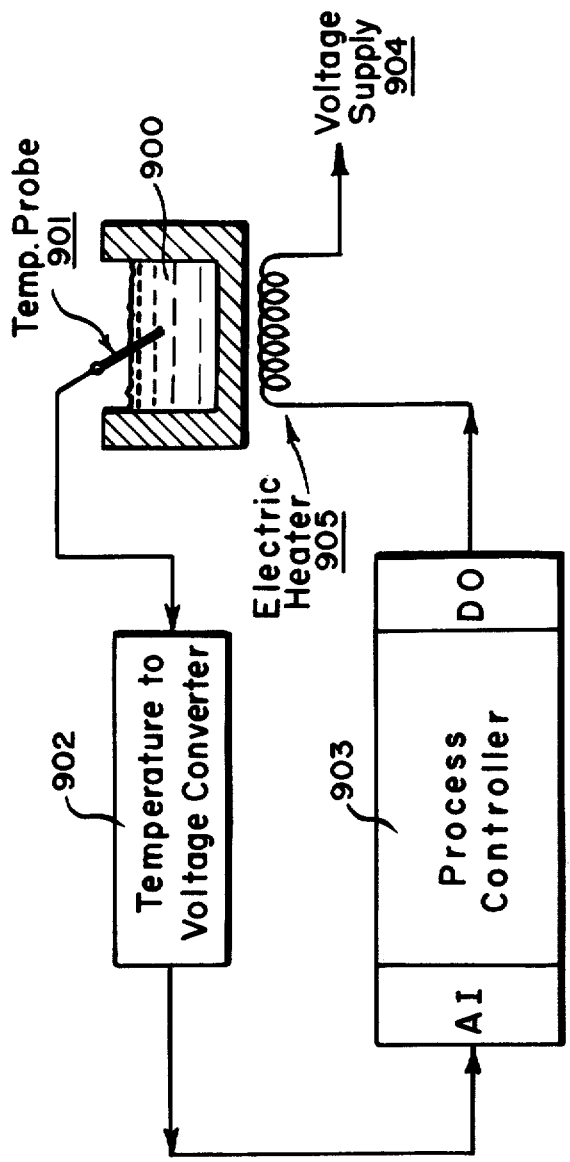
FIGS. 9A and 9B are illustrations of a simple process and a simulated control circuit by which it is controlled in accordance with the invention.

Control Of A Simple Process Involving Connection Of An Input To Two Successive Control Blocks And An Output An extremely simple exemplary process for control by the invention is the process of keeping water at a constant temperature, e.g. 100° F. FIG. 9A illustrates the apparatus used in this process comprising a container of water 900, an analog sensing device comprising a temperature probe 901 and a temperature-to-voltage converter 902, a process controller 903, and a discrete process control device such as on-off voltage supply 904 connected to an electrical heater 905.

Figure 9B:
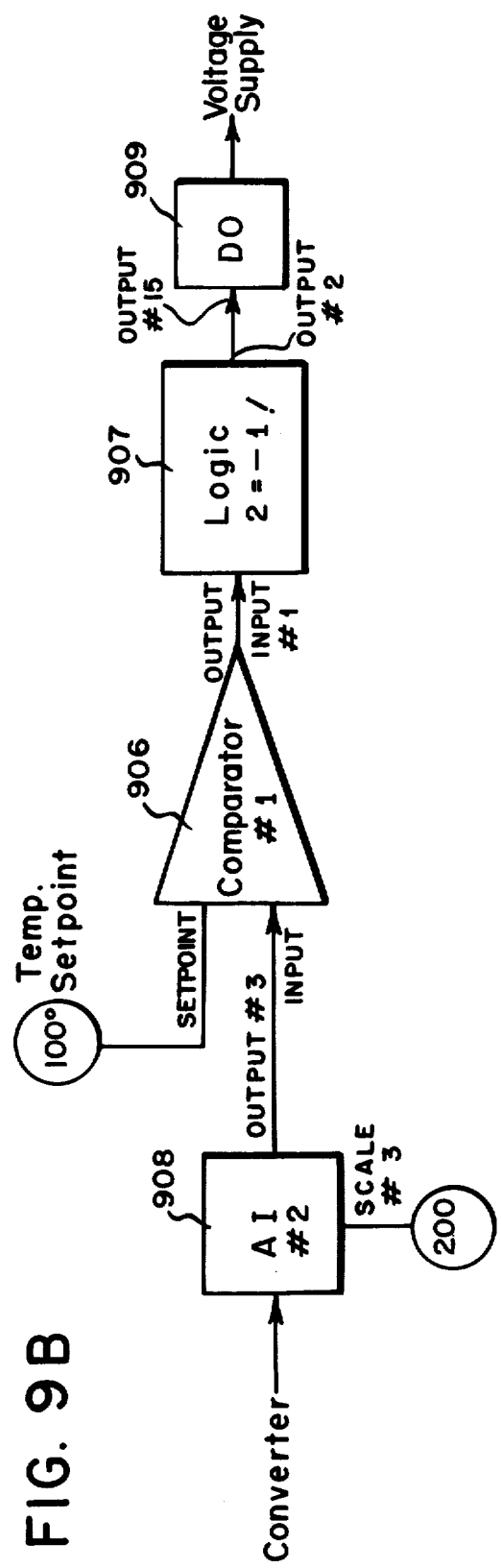

FIG. 9B illustrates a simulated control circuit for controlling the process of FIG. 9A comprising, in substance, a simulated comparator block 906 for receiving an analog process control signal, the comparator being coupled to a simulated logical control block 907 for receiving the output of the comparator and sending a discrete output control signal to the voltage supply 904. More specifically, an analog temperature signal from the converter 902 is connected to a terminal of an analog input module 908 of the process controller, e.g. the third terminal of the second module). This signal is, in turn, coupled by a simulated internal signal wire (e.g. number 113) to the input of a simulated comparator 906 (e.g. number 1). At the comparator, the analog input signal is compared with a setpoint corresponding to a temperature of 100° F. If the temperature signal exceeds the 100° F setpoint, the comparator generates a discrete "on" signal output. If the temperature signal drops below the 100° F, setpoint, the comparator turns off.

The output of the comparator is transmitted by a simulated internal signal wire (e.g. number 39) to an input terminal of a simulated logic control block 907 (e.g. the first input terminal of the 6th logic control block). The logic block is programmed to invert the condition of the signal on input 1 and present the result to output 7, which output is coupled to a terminal of a discrete output module 909 (e.g. the 15th terminal of module 19) by a simulated intenal signal wire (e.g. number 55).

Under this simulated control circuit, the voltage supply powers the heater only when the sensed voltage drops below 100° F. when the sensed voltage exceeds 100° F., the comparator is "on" but the comparator signal is inverted by the logic block to turn the voltage supply "off".

In order to set up this simulated control circuit in the process controller of the invention, the following steps are performed:

| Step | Purpose |
|---|---|
| 1. Hit the System key. | Accesses system mode. |
| 2. Hit the Analog In, 2, Input, 3, Enter and Read keys. | Selects AI 2, Input 3 and displays prior wires. |
| 3. Hit the Clear, 113, | Attaches wire 113 to AI2, Input 3 |

-continued

| Step | Purpose |
| --- | --- |
| 4. Hit the Comparator, 1, Input and Read keys. | Selects input of comparator displays prior wire. |
| 5. Hit the Clear, 113 and Enter keys. | Attaches wire 113 to comparator input. |
| 6. Hit the Comparator, 1, setpoint, and Read keys. | Displays prior setpoint |
| 7. Hit the Clear, 99, and Enter keys. | Attaches wire 99 to setpoint. |
| 8. Hit the Comparator, 1, Output, and Read keys. | Selects output of comparator 1 and displays prior wires. |
| 9. Hit the Clear, 39, and Enter keys. | Attaches wire 39 to comparator output. |
| 10. Hit the Logic, 6, Input 1, Enter, and Read keys. | Selects input 1 of logic block 6 and displays prior wire. |
| 11. Hit the Clear, 39, and Enter keys. | Attaches wire 39 to logic block input. |
| 12. Hit the Logic, 6, Output, 7, Enter and Read keys. | Selects output 7 of logic block and displays prior wire. |
| 13. Hit the Clear, 55, and Enter, keys. | Attaches wire 55 to logic block output. |
| 14. Hit the Discrete Out, 19, Output, 15, Enter and Read keys. | Selects terminal 15 of discrete output module 19 and displays prior wire. |
| 15. Hit the Clear, 55, and Enter keys | Attaches wire 55 to discrete output terminal. |
| 16. Hit System key | Operator leaves the system mode. |
| 17. Hit Comparator, Setpoint, Read keys | The current value of the setpoint is displayed. |
| 18. Hit Clear, 100 and Enter | A 100° F setpoint has been entered. |

While the invention has been described in connection with a small number of specific embodiments, it is understood that these embodiments are merely illustrative of the many possible specific embodiments which can represent applications of the principles of the invention. Numerous and varied systems can be made by those skilled in the art without departing from the spirit and scope of the invention.

I claim:

1. An electronic digital process controller for controlling processes of the type utilizing the processing of input signals including one or more analog input signals in order to derive one or more output control signals for controlling one or more process control devices, and controller comprising:

input means for coupling one or more input signals from one or more process sensing devices to a computer, said input means including one or more terminals for receiving analog input signals and one or more paths for coupling said analog input signals to a computer;

coupled to said input means, an electronic digital computer for receiving said input signals from said input means and processing said input signals to derive one or more process control signals for controlling said process, said computer being programmed to simulate the functions of one or more analog process control blocks;

output means for coupling said computer to one or more process control devices, said output means including one or more output paths for coupling said process control signals to said process control devices and one or more terminals for connecting said paths to said process control devices; and a process operator's panel coupled to said computer, said panel including:

a. means for selecting each of said one or more analog input signals for processing by said computer.

b. means for selecting each of said one or more analog process control blocks for processing a selected analog input signal; and c. means for selecting each of said one or more process control signals and each of said one or more output paths whereby a selected process control signal is directed to a selected output terminal.

2. An electronic process controller according to claim 1 wherein:

said one or more analog input signals comprises a plurality of analog input signals;

said one or more analog process control blocks comprises a plurality of process control blocks;

said one or more output paths comprises a plurality of output paths.

3. An electronic process controller according to claim 1 wherein:

said computer is programmed to simulate the function of a plurality of process control blocks and to simulate a process control circuit comprising a selected arrangement of said process control blocks; and said process operator's panel includes means for selecting an arrangement of said simulated analog process control blocks whereby the computer simulates a process control circuit.

4. An electronic process controller according to claim 1 wherein:

said input signals include one or more discrete input signals;

said input means includes one or more terminals for receiving discrete input signals and one or more paths for coupling said discrete input signals to said computer;

said computer is programmed to simulate the function of one or more discrete process control blocks; and said process operator's panel includes:

a. means for selecting each of said one or more discrete input signals for processing by said computer, and b. means for selecting each of said one or more discrete process control blocks for processing a selected discrete input signal.

5. An electronic process controller according to claim 4 wherein:

said one or more discrete input signals comprises a plurality of discrete input signals; and said one or more discrete process control blocks comprises a plurality of discrete process control blocks.

6. An electronic digital process controller for controlling processes of the type utilizing the processing of analog and discrete input signals to derive a plurality of output control signals for controlling a plurality of process control devices, said controller comprising:

input means for coupling a plurality of input signals from a plurality of analog and discrete process sensing devices to a computer, said input means including a plurality of terminals for receiving analog input signals, a plurality of terminals for receiving discrete input signals, a plurality of paths for coupling analog input signals from said analog input terminals to said computer and a plurality of paths for coupling discrete input signals from said discrete input terminals to said computer;

coupled to said input means, an electronic digital computer for receiving said input signals from said input means and processing said input signals to derive a plurality of analog and discrete process control signals for controlling said process, said computer being programmed to simulate the functions of a plurality of analog process control blocks and to simulate the functions of a plurality of discrete process control blocks;

output means for coupling said computer to a plurality of analog and discrete process control devices, said output means including a plurality of analog output paths for coupling said analog process control signals to said analog process control devices and a plurality of analog output terminals for connecting said analog output paths to said analog process control devices, and said output means also including a plurality of discrete output paths for coupling discrete process control signals to said discrete process control devices and a plurality of discrete output terminals for connecting said discrete output paths to said discrete process control devices; and a process operator's panel coupled to said computer, said panel including:
a. means for selecting each of said analog input signals for processing by said computer,
b. means for selecting each of said discrete input signals for processing by said computer,
c. means for selecting each of said process control blocks for processing a selected input signal;
d. means for selecting each of said analog process control signals and each of said analog output paths whereby a selected analog process control signal is directed to a selected analog output terminal,
e. means for selecting each of said discrete process control signals and each of said discrete output paths whereby a selected discrete process control signal is directed to a selected discrete output terminal.

7. An electronic process controller according to claim 6 wherein:
said computer is programmed to simulate a process control circuit comprising a selected arrangement of said process control blocks; and
said process operator's panel includes means for selecting an arrangement of said process control blocks whereby the computer simulates a process control circuit.

8. An electronic process controller according to claim 6 wherein:
said computer is programmed to simulate a plurality of analog process control blocks, each having a simulated input terminal and a simulated output terminal and a plurality of simulated internal signal wires for interconnecting the simulated input terminals and output terminals of respective ones of said simulated analog process control blocks; and
said process operator's panel includes means for selecting specific ones of said simulated internal signal wires; and means for interconnecting said simulated internal signal wires to simulated input and output terminals of respective simulated analog process control blocks, thereby simulating a process control circuit comprising said respective simulated control blocks.

9. An electronic process controller according to claim 6 wherein:
said computer is programmed to simulate a plurality of discrete process control blocks, each having a simulated input terminal and a simulated output terminal and a plurality of simulated internal signal wires for interconnecting the simulated input terminals and output terminals of respective ones of said simulated discrete process control blocks; and
said process operator's panel includes means for selecting specific simulated input and output terminals of said simulated discrete process control blocks; means for selecting specific ones of said simulated internal signal wires; and means for interconnecting said simulated internal signal wires to said simulated input and output terminals of respective simulated discrete process control blocks, thereby simulating a process control circuit comprising said respective simulated control blocks.

10. An electronic process controller according to claim 6 wherein:
said computer is programmed to simulate a plurality of analog process control blocks each having a simulated input terminal and a simulated output terminal, a plurality of discrete process control blocks each having a simulated input terminal and a simulated output terminal, a plurality of simulated internal signal wires for interconnecting analog terminals, and a plurality of simulated internal signal wires for interconnecting discrete terminals; and
said process operator's panel includes means for selecting specific input and output terminals of simulated analog and discrete control blocks, means for selecting specific simulated analog and discrete internal signal wires, and means for interconnecting said simulated internal signal wires to said simulated input and output terminals of respective simulated control blocks, thereby simulating a process control circuit comprising said respective simulated control blocks.

11. An electronic process controller according to claim 10 wherein said computer is programmed to simulate a counter control block for counting the number of pulses that occur in a selected discrete input signal.

12. An electronic process controller according to claim 10 wherein said computer is programmed to simulate a timer control block for providing an output pulse of pre-selected time duration.

13. An electronic process controller according to claim 10 wherein said computer is programmed to simulate a comparator control block for comparing an analog input signal to a pre-selected reference signal.

14. An electronic process controller according to claim 10 wherein said computer is programmed to simulate a sequencer control block for sequentially transmitting a selected input to each of a plurality of selected outputs.

15. An electronic process controller according to claim 10 wherein said computer is programmed to simulate a rate control block for permitting the specification of time periods between executions by simulated control blocks.

16. An electronic process controller according to claim 10 wherein said computer is programmed to simulate a lead-lag control block for applying a time lead or lag to an analog input signal.

17. An electronic process controller according to claim 10 wherein said computer is programmed to simulate a track/hold control block for permitting the receipt and storage of a selected analog input signal for presentation upon receipt of a selection signal.

18. An electronic process controller according to claim 10 wherein said computer is programmed to simulate an integrator control block for integrating an analog signal with respect to time.

19. An electronic process controller according to claim 10 wherein said computer is programmed to simulate a differentiator control block for differentiating an analog input signal with respect to time.

20. An electronic process controller according to claim 10 wherein said computer is programmed to simulate a multiplexer control block for selecting one of a plurality of input signals for presentation to an output.

21. An electronic process controller according to claim 10 wherein said computer is programmed to simulate a peak detector control block for sampling an analog input signal, storing its largest or smallest value and presenting said largest or smallest value at an input.

22. An electronic process controller according to claim 10 wherein said computer is programmed to simulate an averager control block for averaging an input signal.

23. An electronic process controller according to claim 10 including means for storing a plurality of values of a function of one or more variables and means responsive to input signals corresponding to said variables, for processing an output signal representative of the interpolated value of said function for said input signal variables.

24. An electronic process controller according to claim 10 wherein said computer is also programmed to permit coupling of discrete signals through Boolean logic equations.

25. An electronic process controller according to claim 10 wherein said computer is also programmed to permit coupling of analog signals through arithmetic equations.

26. An electronic process controller according to claim 10 wherein said computer is also programmed for converting binary coded input signals to analog output signals.

27. An electronic process controller according to claim 10 including timing means for generating a signal representative of the time.

* * * * *